(12) United States Patent
Kelty et al.

(10) Patent No.: US 8,054,038 B2
(45) Date of Patent: Nov. 8, 2011

(54) SYSTEM FOR OPTIMIZING BATTERY PACK CUT-OFF VOLTAGE

(75) Inventors: Kurt Russell Kelty, Palo Alto, CA (US); Scott Ira Kohn, Redwood City, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 452 days.

(21) Appl. No.: 12/322,217

(22) Filed: Jan. 29, 2009

(65) Prior Publication Data
US 2010/0188043 A1 Jul. 29, 2010

(51) Int. Cl.
*H02J 7/16* (2006.01)
(52) U.S. Cl. ........................................ 320/109
(58) Field of Classification Search .......... 320/109, 320/132; 702/64, 65, 66
See application file for complete search history.

(56) References Cited

U.S. PATENT DOCUMENTS

| | | | | |
|---|---|---|---|---|
| 5,878,368 | A * | 3/1999 | DeGraaf | 701/209 |
| 6,732,048 | B2 * | 5/2004 | Blewitt | 701/210 |
| 7,181,409 | B1 * | 2/2007 | Murakami et al. | 705/5 |
| 7,665,559 | B2 * | 2/2010 | De La Torre-Bueno | 180/65.29 |
| 7,928,693 | B2 * | 4/2011 | Hafner et al. | 320/132 |
| 2008/0319597 | A1 * | 12/2008 | Yamada | 701/22 |
| 2009/0021218 | A1 * | 1/2009 | Kelty et al. | 320/137 |
| 2009/0062967 | A1 * | 3/2009 | Kressner et al. | 700/286 |
| 2010/0017249 | A1 * | 1/2010 | Fincham et al. | 705/8 |
| 2010/0102776 | A1 * | 4/2010 | Uchida | 320/109 |

FOREIGN PATENT DOCUMENTS

WO WO2008/132947 * 6/2008

OTHER PUBLICATIONS

U.S. Appl. No. 12/651,426, filed Dec. 31, 2009.
U.S. Appl. No. 12/950,089, filed Nov. 19, 2010.

* cited by examiner

*Primary Examiner* — Reena Aurora
(74) *Attorney, Agent, or Firm* — Patent Law Office of David G. Beck

(57) ABSTRACT

A method and apparatus for optimizing the level of battery charging required by an electric vehicle is provided. The system includes an interface for the user to input various travel parameters, such as a travel itinerary, which is then used by the battery charging system during charge optimization. In addition to a travel itinerary, the system may be configured to take into account departure times, road conditions, traffic conditions and weather conditions in determining miles to be traveled as well as the electrical energy per mile conversion factors to be used during optimization.

48 Claims, 16 Drawing Sheets

SYSTEM FOR OPTIMIZING BATTERY PACK CUT-OFF VOLTAGE

FIELD OF THE INVENTION

The present invention relates generally to batteries and, more particularly, to a system for optimizing the cut-off voltage used during the charging cycle of a battery pack, thereby minimizing the amount of time the batteries are subjected to excessive high voltage.

BACKGROUND OF THE INVENTION

Batteries have been used for decades to supply power to a variety of different electrical and electromechanical devices. Early batteries, referred to as disposable batteries, were simply used until depleted and then discarded and replaced with one or more new batteries. A newer type of battery, referred to as a rechargeable battery, is capable of being recharged and then reused, therefore offering economic, environmental and ease-of-use benefits compared to a disposable battery.

Although rechargeable batteries provide a much longer service life than disposable batteries, their service life is not unlimited. Depending upon the type of battery, a rechargeable battery can typically be recharged anywhere from 100 times (e.g., alkaline) to 1000 times (e.g., lithium-ion, lithium-polymer) to 20,000 times or more (e.g., thin film lithium). In addition to depending upon the type of battery chemistry involved, the number of cycles that a rechargeable battery can be recharged depends on a variety of other factors that include; (i) the rate of charging (i.e., slow trickle charge versus fast charge), (ii) the level of charging (i.e., 75% of full charge, full charge, over-charged, etc.), (iii) the level of discharge prior to charging (i.e., completely depleted, still charged to a low level, etc.), (iv) the storage temperature of the battery during non-use, and (v) the temperature of the battery during use.

Due to the high initial cost of rechargeable batteries, expensive products such as laptop computers often incorporate relatively sophisticated power management systems, thereby extending battery life and allowing the use of smaller, lower capacity batteries and/or batteries that utilize less expensive cell chemistries. One of the most common power management techniques is to place certain laptop components and peripherals, especially those that require relatively high levels of power to function, into either a standby mode or a low power usage mode whenever possible. Thus, for example, a laptop may provide two different video screen brightness levels; high brightness when the computer is plugged in, and low brightness when the computer is operating on battery power. This is also the primary purpose behind powering down the video screen when the computer is inactive for more than a short period of time or placing wireless connectivity capabilities (e.g., Bluetooth, WiFi, WAN, etc.) or other non-essential peripherals in standby mode when they are not required.

A growing application for rechargeable batteries is that of electric vehicles. All-electric and hybrid vehicles, however, present a number of engineering challenges, primarily due to the need for the rechargeable battery pack of such a vehicle to meet the consumers' expectations relative to performance, range, reliability, lifetime and cost. The present invention provides a system for optimizing battery pack recharging, thereby extending battery life and helping to achieve the above goals.

SUMMARY OF THE INVENTION

The present invention provides a method and apparatus for controlling the charging system, and in particular the battery pack charge level, of an all-electric or hybrid vehicle based on expected use. As a result of the invention, the vehicle's batteries are not subjected to excessive charging levels, thereby extending the useful lifetime of the battery pack.

In at least one embodiment of the invention, the electric vehicle battery charging system includes a user interface for entering a travel plan; a charging system controller coupled to the user interface and configured to calculate the total travel miles based on the travel plan, to calculate battery pack electrical energy requirements based on the calculated total travel miles, and to set battery pack charging conditions based on the calculated battery pack electrical energy requirements and on the current state of charge of the battery pack; and a battery pack charging system coupled to the charging system controller, the battery pack and a power source, the battery pack charging system charging the battery pack in accordance with the battery pack charging conditions set by the charging system controller. The user interface can be a touch-sensitive screen, for example a touch-sensitive screen integrated within the vehicle. The system can further include a system memory coupled to the charging system controller, the system memory storing battery pack data, electrical energy per mile conversion factors and/or a location database. The charging system controller can be configured to calculate a battery power safety margin and to set the battery pack charging conditions based on the calculated battery pack electrical energy requirements, the current state of charge of the battery pack, and the battery power safety margin. The charging system controller can be configured to set the battery pack charging conditions based on the calculated battery pack electrical energy requirements, the current state of charge of the battery pack, and the departure times entered via the user interface. The system can further include a communication link coupled to an external source of road and traffic conditions, wherein the charging system controller can be configured to set the battery pack charging conditions based on the calculated battery pack electrical energy requirements, the current state of charge of the battery pack, and the road and traffic conditions. The system can further include a communication link coupled to an external source of weather conditions, wherein the charging system controller can be configured to set the battery pack charging conditions based on the calculated battery pack electrical energy requirements, the current state of charge of the battery pack, and the weather conditions.

In at least one embodiment of the invention, a method of charging the battery pack of an electric vehicle is provided, the method comprising the steps of inputting a travel plan into a battery pack charging controller using a user interface; calculating total travel miles based on the travel plan; converting the total travel miles to the quantity of electrical energy that must be stored in the battery pack for the vehicle to travel in accordance with the travel plan; determining the current electrical energy stored in the battery pack; calculating the difference between the quantity of electrical energy that must be stored in the battery pack to meet the needs of the travel plan and the quantity of electrical energy already stored in the battery pack; determining a set of battery pack charging conditions based on the calculated difference in electrical energy; inputting the set of battery pack charging conditions into the battery pack charging system; and charging the battery pack in accordance with the set of battery pack charging conditions. The method can further comprise the step of calculating a battery power safety margin, wherein the set of battery pack charging conditions is based on the battery power safety margin and on the calculated difference in electrical energy between the required electrical energy to meet the needs of the travel plan and that stored in the battery pack. The method can further comprise the step of inputting the battery power safety margin via the user interface, wherein the set of battery pack charging conditions is based on the battery power safety margin and on the calculated difference in electrical energy between the required electrical energy to meet the needs of the travel plan and that stored in the battery pack. The method can further comprise the step of obtaining road and traffic condition information and modifying a miles-to-electrical energy conversion factor and/or the travel plan in response to the road and traffic conditions. The method can further comprise the step of obtaining weather condition information and modifying a miles-to-electrical energy conversion factor and/or the travel plan in response to the weather conditions. The method can further comprise the steps of inputting departure time information into the battery pack charging controller, determining a charging start time based on the departure time information, inputting the charging start time into the charging system, and initiating battery pack charging in response to the battery pack charging start time. The method can further comprise the steps of inputting and/or obtaining electricity cost as a function of usage time data and using that data and the departure time information to determine the charging start time. The method can further comprise the steps of inputting mid-travel recharging information into the battery pack charging controller and using that information in setting the battery pack charging conditions. The method can further comprise the steps of inputting driving style information into the battery pack charging controller and using that information in setting the battery pack charging conditions.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and current capacity for a particular application. The term "electric vehicle" as used herein refers to either an all electric vehicle, also referred to as an EV, plug-in hybrid vehicles, also referred to as a PHEV, or a hybrid vehicle (HEV), a hybrid vehicle utilizing multiple propulsion sources one of which is an electric drive system.

Figure 1:
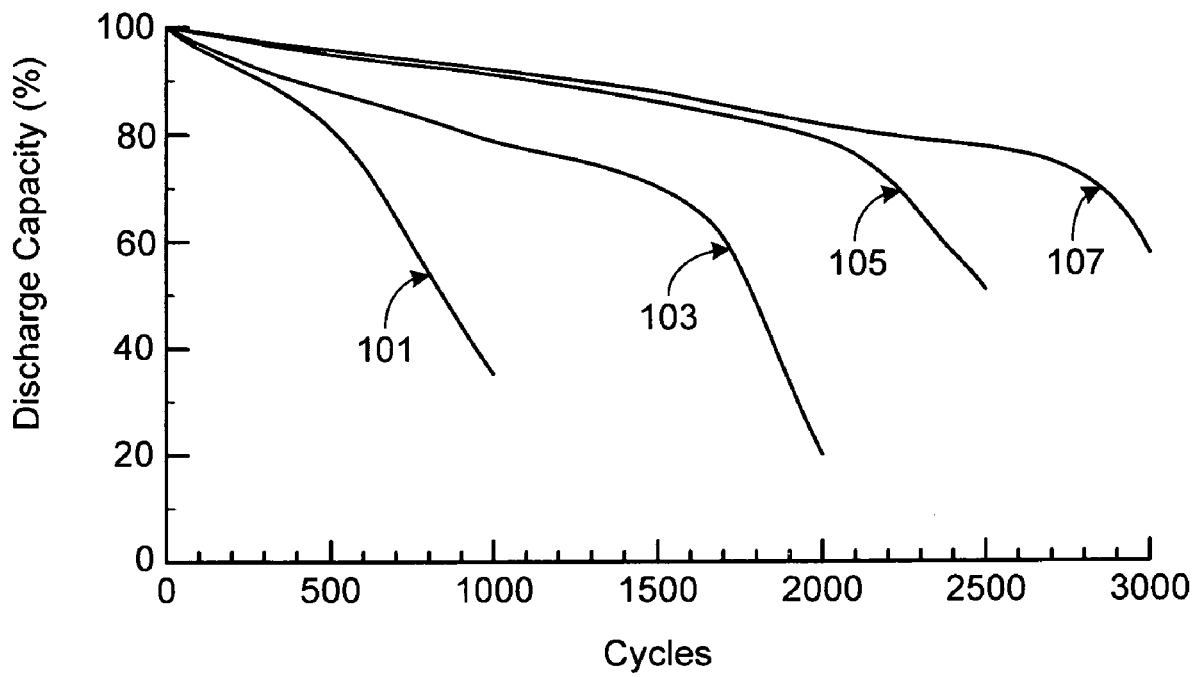
FIG. 1 graphically illustrates the effects of charging cut-off voltage and the depth of discharge on battery life.

FIG. 1 is a graph that illustrates the effects of charging cut-off voltage and the depth of discharge on battery life, more specifically on the discharge capacity over time measured in cycles. The cut-off voltage is the voltage at which charging is terminated. The depth of discharge is the degree to which energy is withdrawn from a battery compared with its original charged energy state, expressed as a percentage of full capacity. It should be understood that different battery packs, for example those using different cell chemistries, will exhibit different profiles than those shown in FIG. 1, and that this figure is only meant to be illustrative, not limiting.

Curve 101 of FIG. 1 was obtained by repeatedly cycling a battery from a completely charged state, i.e., 100% state of charge, to a fully discharged state, i.e., 0% state of charge. As expected, maximizing the time spent at high voltage as well as the depth of discharge had the greatest effects on battery life, specifically leading to the test battery having less than 50% remaining capacity after 900 cycles. Curve 103 illustrates that the lifetime of the battery can be approximately doubled by limiting the depth of discharge to 50% for each cycle. Further improvement was achieved by additionally limiting the charge cut-off voltage during the charging cycle. Specifically, curve 105 was taken by cycling a battery from a 75% state of charge to a 25% state of charge. For these conditions, the discharge capacity dropped to 50% after approximately 2500 cycles. Lastly, by limiting the charge cut-off voltage to a level that achieves an approximately 50% state of charge, and then cycling between this level and a fully discharged state (0% state of charge), the test battery exhibited the best performance of this test. Specifically, and as illustrated by curve 107, under these conditions the battery had a remaining capacity of between 50 and 60% after 3000 cycles.

Recognizing the benefits of limiting the degree to which a battery is charged, the present inventors have devised a system for flexibly controlling the battery charge level of an electric vehicle based on expected use. In particular, the system of the invention only charges the vehicle's battery pack to the level required to meet the driving requirements of the user for the period following the next charging cycle. As a result of this approach, the vehicle's batteries are not subjected to excessive charging levels, thereby extending the useful lifetime of the battery pack.

Figure 2:
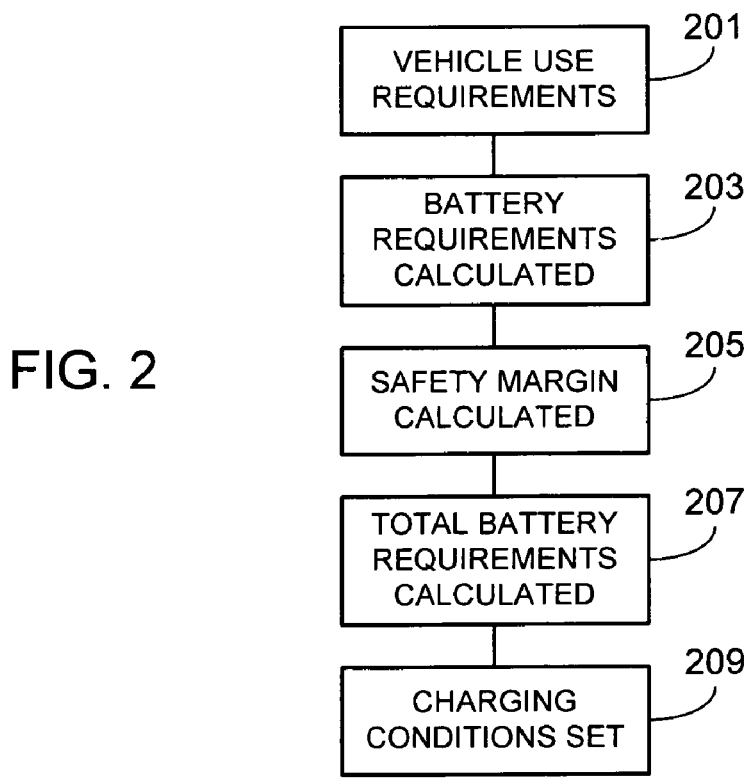
FIG. 2 illustrates the basic methodology of the invention.

FIG. 2 illustrates the basic methodology of the invention. As shown, the first step of the process is to determine the expected vehicle use for the period of time following the next charging cycle (step 201). An on-board system processor then calculates the requirements that will be placed on the battery system based on the expected vehicle use (step 203). The processor then calculates a safety margin (step 205) that is added to the calculated battery system requirements, the safety margin insuring that the vehicle is able to meet the needs of the user even if the user makes a last minute modification to the day's driving/use plan or other unforeseen circumstances extend the needs placed on the battery system. The processor then calculates the total battery requirements (step 207) based on both expected use and the safety margin, and sets the charging conditions, e.g., cut-off voltage (step 209).

Figure 3:
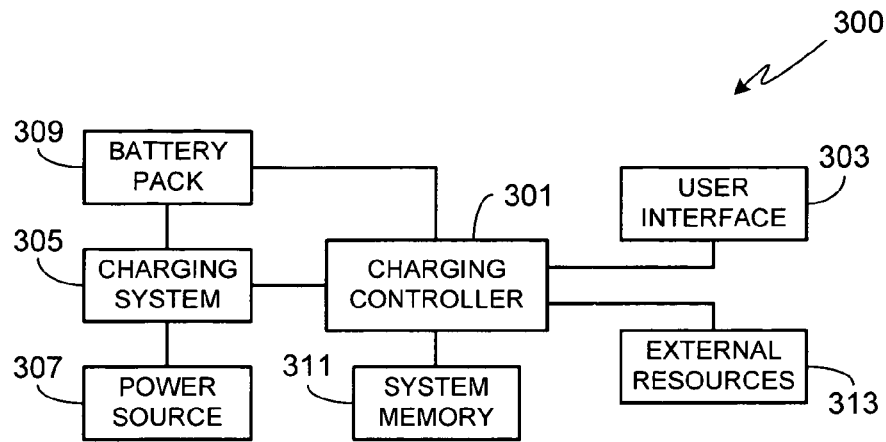
FIG. 3 illustrates a high-level view of the primary vehicle subsystems used in a battery charging system designed in accordance with a preferred embodiment of the invention.

FIG. 3 is a high-level view of the primary vehicle subsystems used in a battery charging system designed in accordance with a preferred embodiment of the invention. It will be appreciated that a vehicle can utilize other subsystem configurations while still retaining the battery charging control capabilities of the present invention. At the heart of system 300 is the charging controller 301. Charging controller 301 uses information relating to predicted future use of the vehicle, for example information provided by user interface 303, to calculate the battery requirements and thus the charging requirements which are then implemented by charging system 305. During the controlled charging cycle, charging system 305 is coupled to an external charging power source 307, such as a municipal power grid, and to the vehicle's battery pack 309. Charging controller 301 is also coupled to memory 311, thereby providing controller 301 with access to historical data, for example driving routines, average vehicle mileage, specific driver practices, previous driving routes, prior battery use, etc. In at least one preferred embodiment, controller 301 is also coupled to external data sources, for example global positioning system (GPS) data, weather data, traffic and road conditions, etc.

Figure 4:
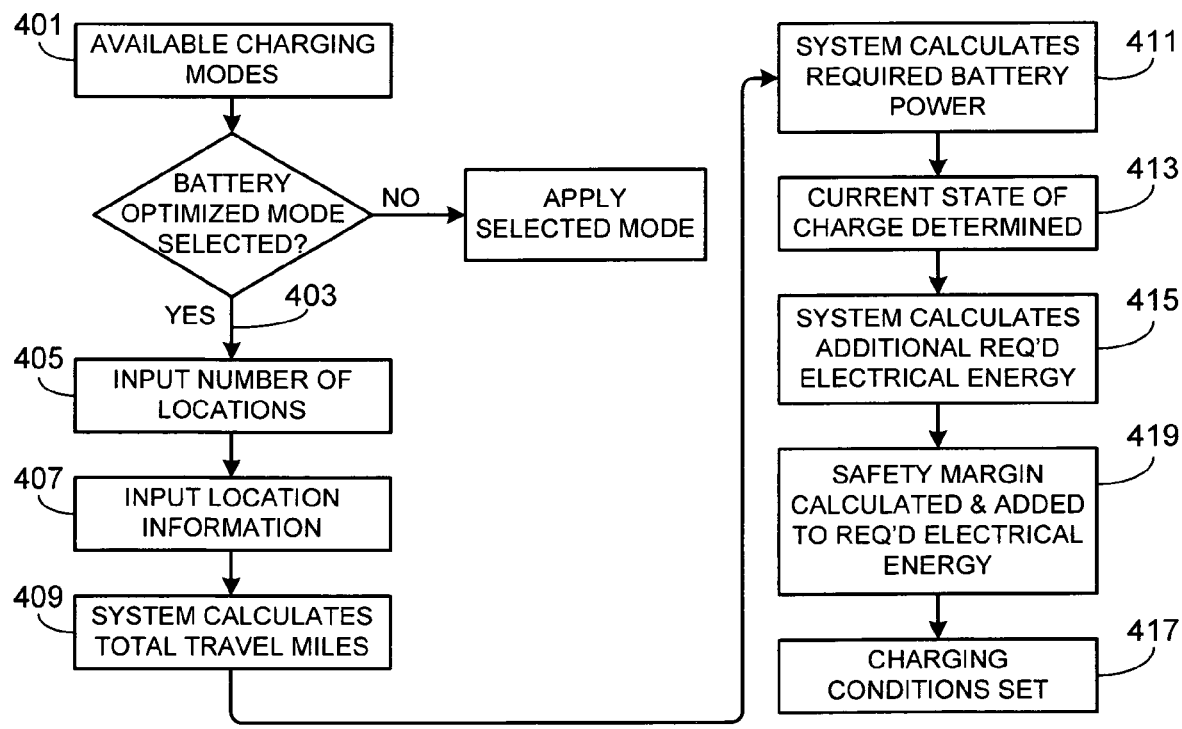
FIG. 4 illustrates the methodology of a preferred embodiment of the invention.

In a preferred embodiment of the invention illustrated in FIG. 4, the user is given several charging options (step 401), one of which uses optimized battery charging as described herein. Other charging options may or may not include a Standard Mode which provides an optimal compromise between performance, driving range and battery life without having additional information on the expected demands to be placed on the battery pack during the next driving period; a Storage Mode that is configured to optimize battery life when the vehicle is stored for an extended period of time; a Max Range Mode that optimizes the system in order to achieve maximum driving range; and a Performance Mode that achieves the best vehicle performance at the cost of battery life and range. Further descriptions of these alternate charging modes is given in co-pending U.S. patent application Ser. No. 12/321,279, filed Jan. 16, 2009, the disclosure of which is incorporated herein for any and all purposes.

In one embodiment, controller 301 prompts the user to select a charging mode, for example when the user switches the car from the operating/driving mode to the standby mode by turning off the ignition switch or through other means. In an alternate embodiment, a default charging mode is used unless a non-default charging mode is requested by the end user.

The user requests a non-default charging mode using user interface 303. Interface 303 can be a touch-sensitive screen as preferred, or a non-touch sensitive screen used in conjunction with one or more switches (e.g., toggle switches, push button switches, slide switches, rotating switches, etc.), a plurality of switches used alone (e.g., toggle switches, push button switches, slide switches, rotating switches, etc.), a voice recognition system, a remote mode selector, or by other means.

Figure 5:
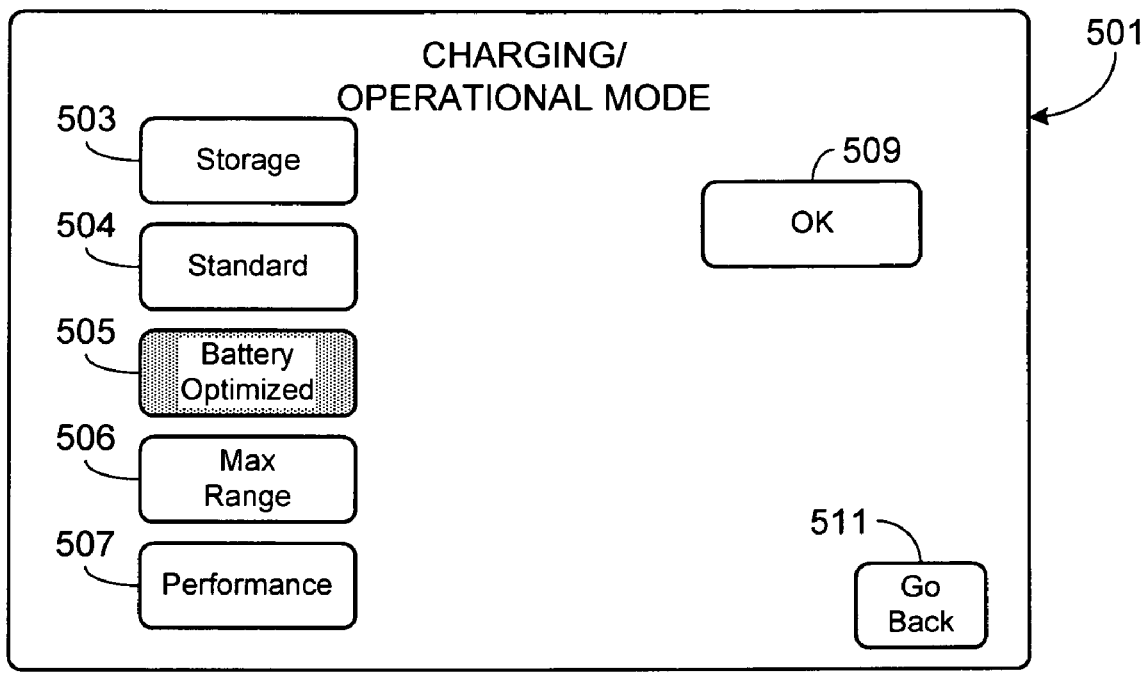
FIG. 5 illustrates a preferred embodiment of a charging mode selection screen.
Figure 6:
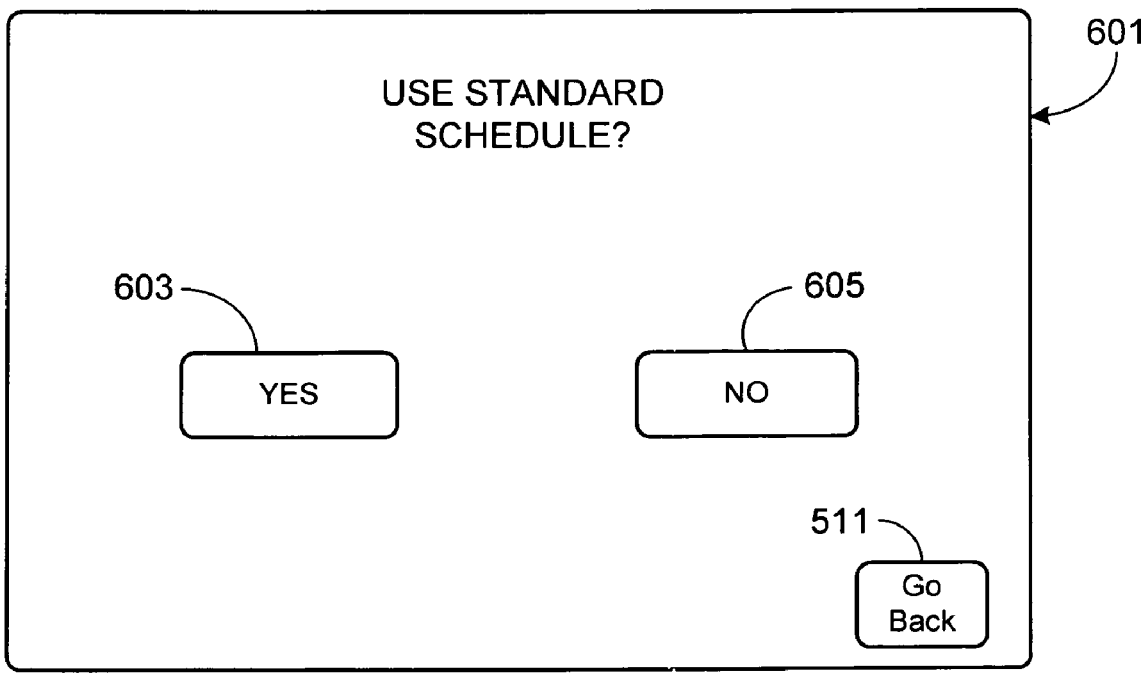
FIG. 6 illustrates a data input screen that allows the user to accept a previously defined travel plan.

FIG. 5 illustrates a preferred embodiment of a charging mode selection screen 501 that corresponds to step 401. Although this and other aspects of the invention are described herein using a touch-sensitive display as the user interface, as previously noted other user interfaces can similarly be employed by the invention. In this embodiment, touching one of the buttons 503-507 causes the corresponding mode to be selected. Preferably the touched button is highlighted to indicate the selection. In FIG. 5, button 505 is shown as highlighted, corresponding to the selection of the Battery Optimized Mode (step 403). In an alternate embodiment, a mode selection button must be touched followed by pushing (i.e., touching) a data entry button 509. Requiring the selection of two buttons, i.e., the mode button and the data entry button, decreases the risk of an inadvertent mode change. In an alternate embodiment that is intended to further reduce the risk of inadvertent or unauthorized mode changes, after selecting a mode, or after selecting a mode and touching the data entry button, a secondary mode selection screen is displayed that requests a user personal identification number (PIN) or password. Screen 501 also provides a Go Back button 511 that allows the user to cancel their last procedural step, i.e., go back a step. Preferably each data input screen provides a Go Back, or cancel, button 511.

After the user selects the Battery Optimized Mode from the available modes (step 403), they are presented with a plurality of data input screens. In a preferred embodiment, the first data input screen 601 allows the user to accept a previously defined travel plan, referred to as a Standard Schedule. This travel plan is input using input screens such as those discussed below, but designated as the user's Standard Schedule. Once the Standard Schedule travel plan has been defined, button 603 allows the user to input a complete travel plan with a single button touch, an ideal solution for commuters who may often follow the same routine. If the user wishes to enter a new travel plan, they press or touch button 605.

In a preferred embodiment, the first data input screen for a new travel plan requires the user to select the number of locations that they plan to drive to during the next driving period (step 405). Although the next driving period will typically be the next day since most users charge their vehicles nightly and use their cars on a daily basis, it will be appreciated that the next driving period could be days, or weeks, into the future. For example, the user may not drive the car during weekends.

Figure 7:
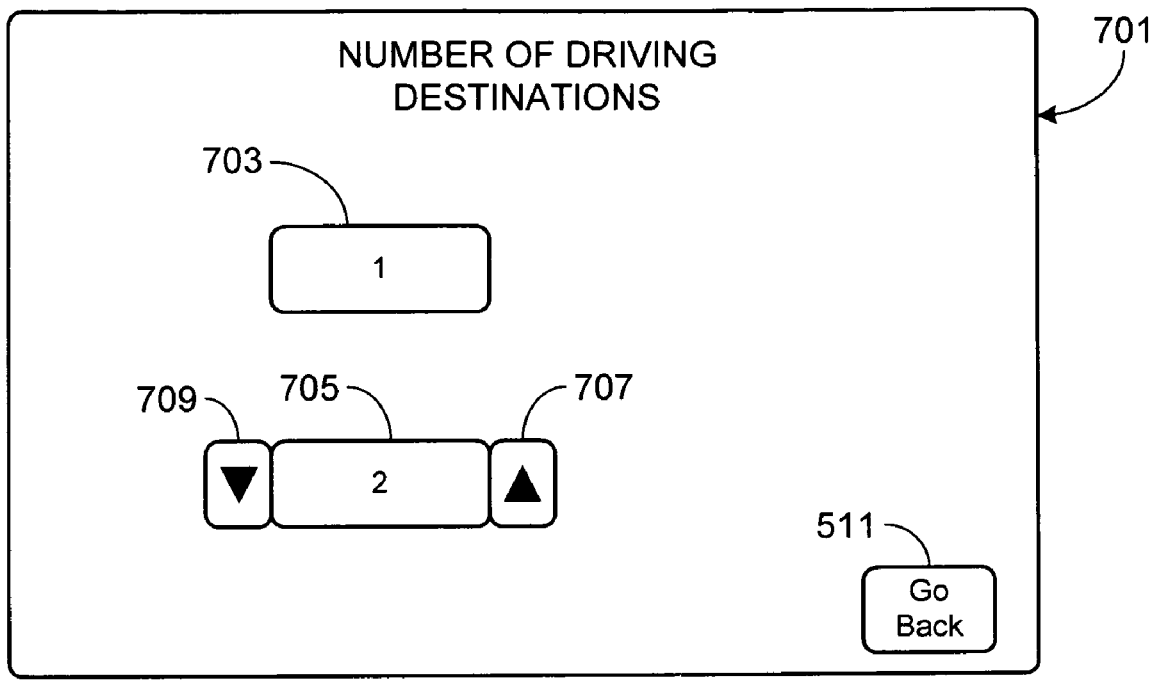
FIG. 7 illustrates a data input screen for inputting the number of travel locations for the next driving period.

Touch-sensitive screen 701 of FIG. 7 provides a method for the user to input the number of locations for the next driving period. Touch button 703 corresponds to a single location and touch button 705 corresponds to multiple locations. In this embodiment, on either side of button 705 are touch sensitive buttons 707 and 709 that allow the user to either increase (button 707) or decrease (button 709) the number shown in the display region of button 705. Accordingly the user, if selecting more than 1 location, uses touch regions 707 and 709 to increase/decrease the number within button 705 until it is correct, and then presses, i.e., touches, button 705 to input that number of locations into the system (step 405). In an alternate embodiment, the functions of touch buttons 703 and 705 are combined into a single button. In another alternate embodiment, a data entry button is used to input the location number after a correct value has been achieved using touch buttons 707 and 709.

Figure 8:
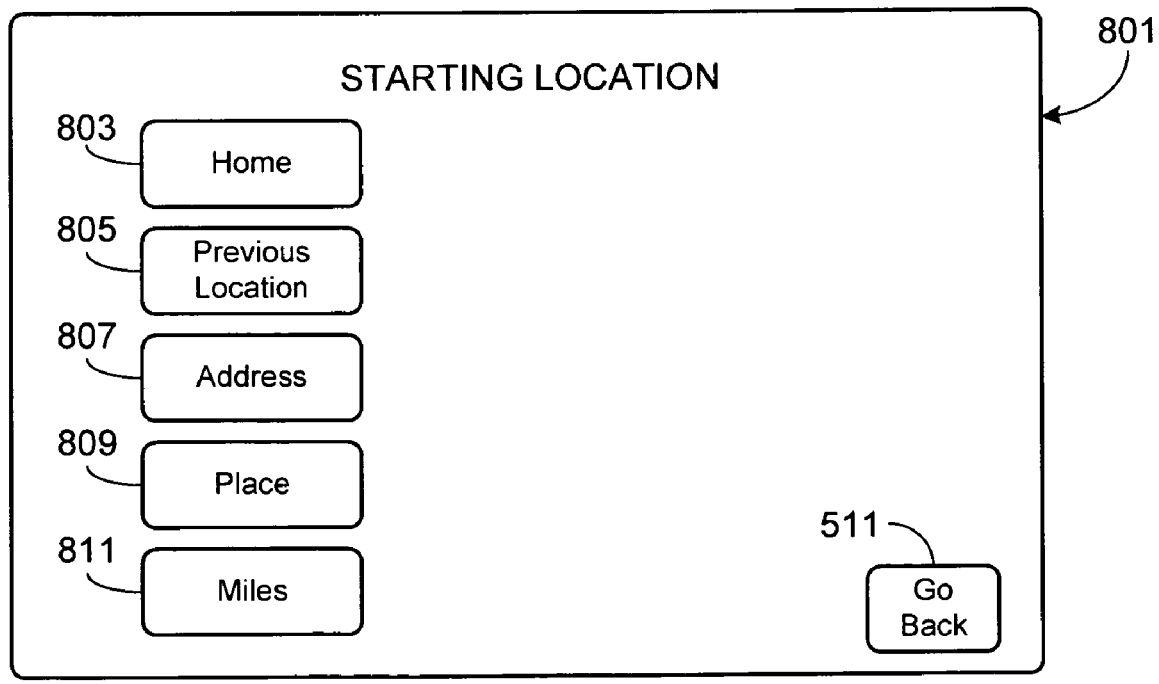
FIG. 8 illustrates a data input screen for inputting an initial departure location.

The next step, step 407, is to input location information so that controller 301 can determine the basic requirements that will be placed on the battery system. FIG. 8 illustrates a touch-sensitive screen 801 that can be used to input location information for a single location. Although the system can also be configured to allow the user to enter multiple locations on a single screen, such an approach is not preferred as some users may find such a screen too complex. Accordingly, an approach using multiple data entry screens is preferred due to its simplicity.

Figure 9:
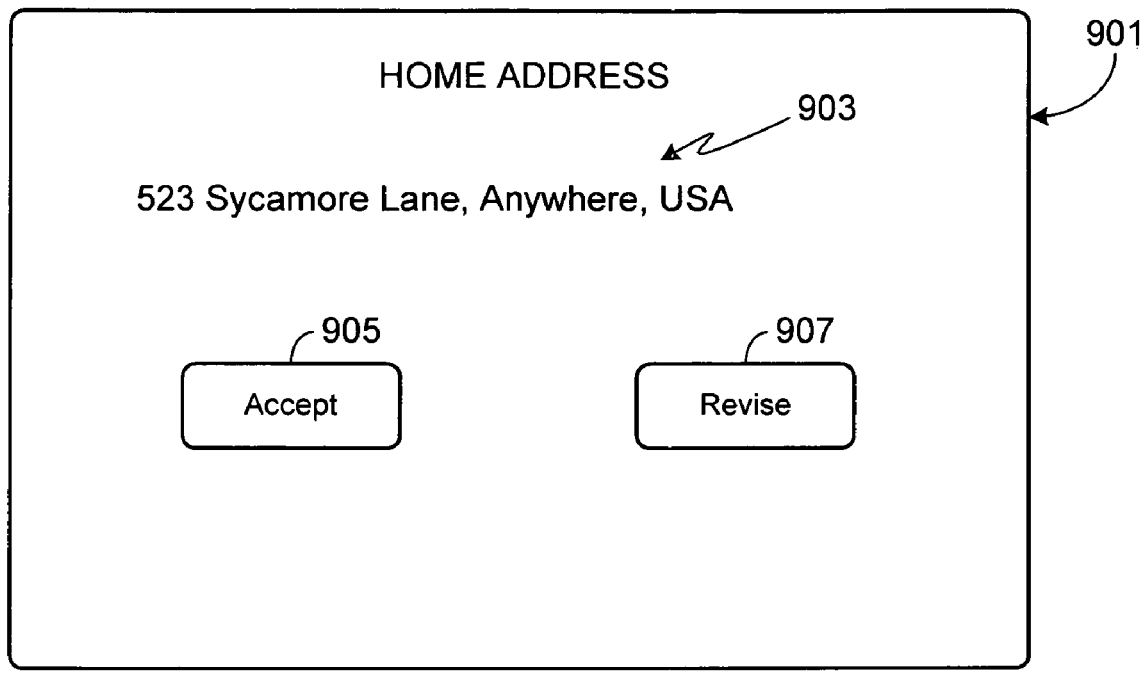
FIG. 9 illustrates a data screen for verifying the user's home address.

Screen 801 is used to enter the travel starting point. The default location is the user's home. Preferably the user's home location has been entered previously, for example during initial vehicle set-up, and stored in memory 311. To enter the user's home as the starting point, the user simply presses or touches button 803 labeled Home. Preferably if the user enters Home as the starting point, another screen is displayed (screen 901 of FIG. 9) which provides the user's home address (display region 903) and asks for verification (button 905) that the given address is correct. If the given address is incorrect, the user can select to revise the address (button 907), preferably causing a home address data entry screen, not shown, to be presented so that the user can enter or correct their home address.

Figure 10:
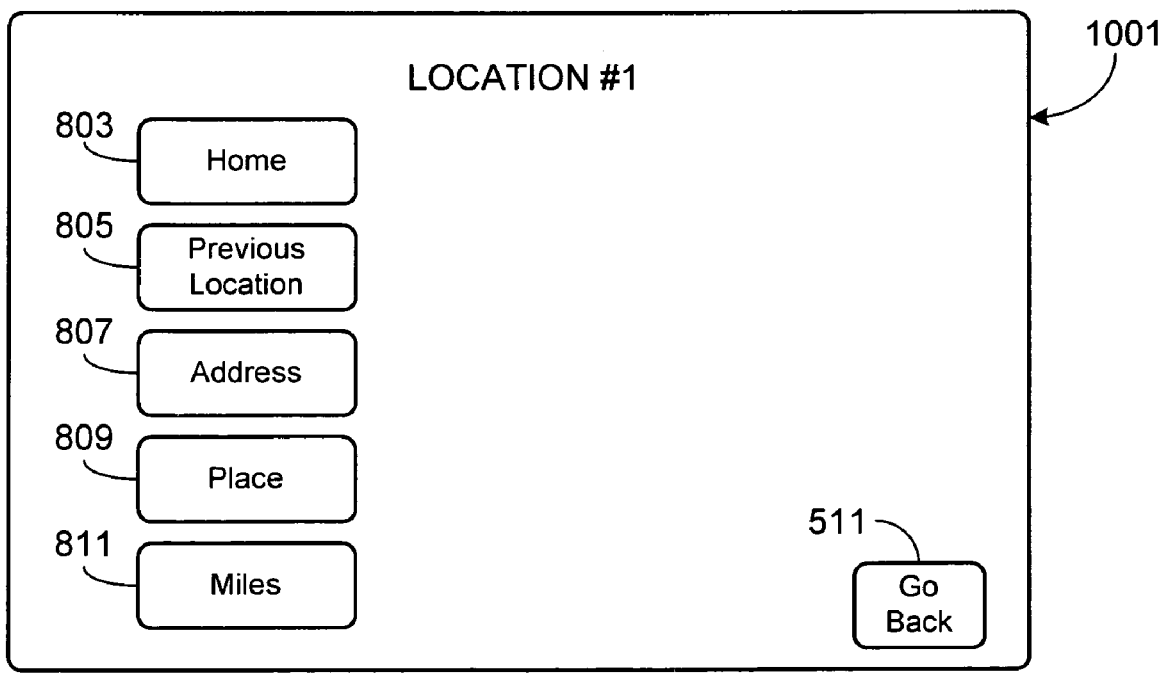
FIG. 10 illustrates a data screen for inputting location information.

In the preferred embodiment, in addition to the Home button, the user can enter location information by picking a Previous Location (touch button 805), an Address (touch button 807), a Place (touch button 809), or Miles (touch button 811). In order to simplify data entry and help the user to become familiar with the system, preferably each screen requesting location input has a similar layout to that shown in FIG. 8. For example, screen 1001 of FIG. 10 is almost identical to screen 801 except that it is requesting Location #1 data.

Figure 11:
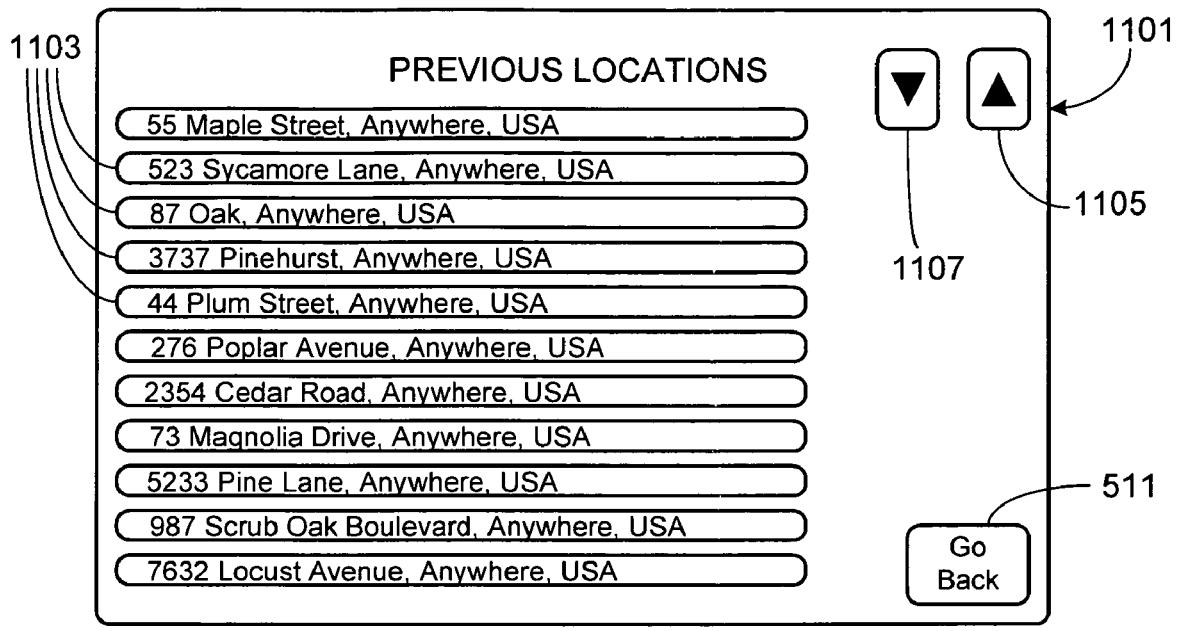
FIG. 11 illustrates a data screen of previously visited locations.

If the user selects Previous Location button 805 on a location input screen, a secondary screen 1101 is presented as shown in FIG. 11. This screen provides a list of previous locations 1103, each of which corresponds to its own touch button. The list of previous locations is stored in memory 311 and is preferably presented to the user in reverse chronological order, i.e., the first listed is the last visited, the second listed is the second to last location visited, etc. It will be appreciated that this data can also be presented in other ways, such as alphabetical order, based on the number of times the location has been visited, etc. The user selects a specific previous location by touching the button 1103 that corresponds to the desired location. If the list of locations contains more locations than can be viewed on a single screen, scroll up button 1105 and scroll down button 1107 can be used to view additional locations. If the desired location is not on the list, the user can press or touch Go Back button 511, causing the system to go back to the prior location input screen.

Figure 12:
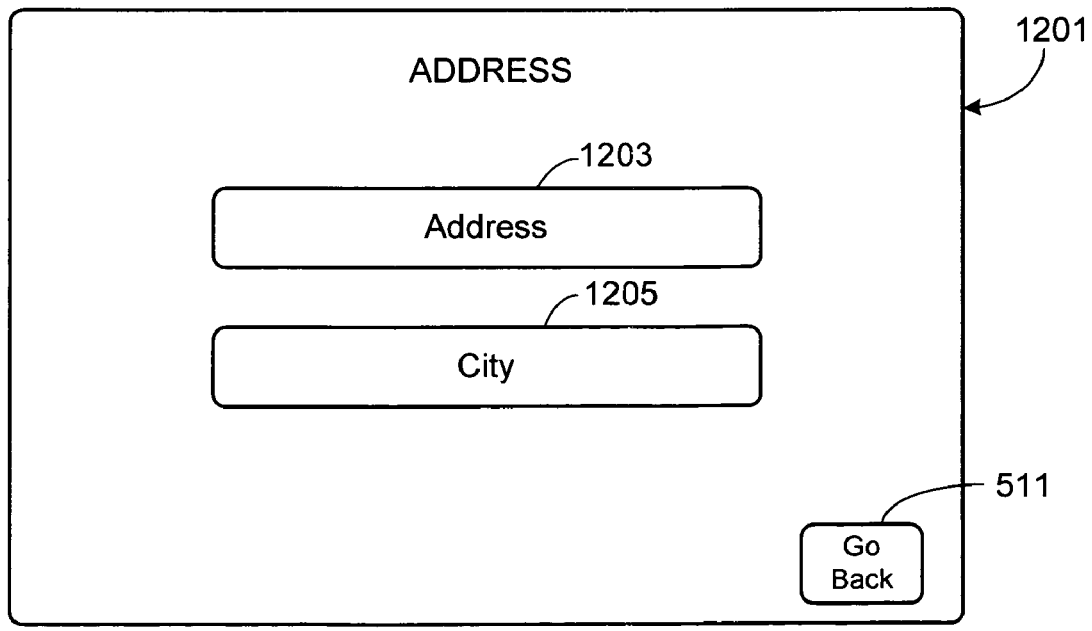
FIG. 12 illustrates a data screen for inputting a new location address.
Figure 13:
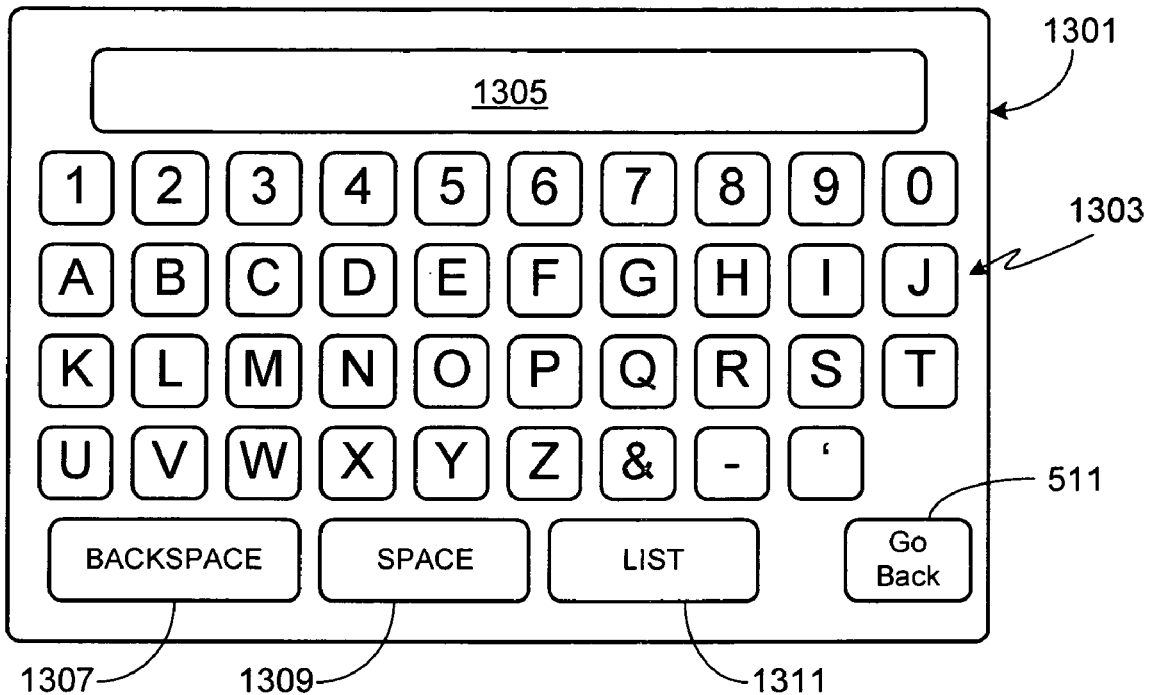
FIG. 13 illustrates a data screen for inputting a street or city name.
Figure 14:
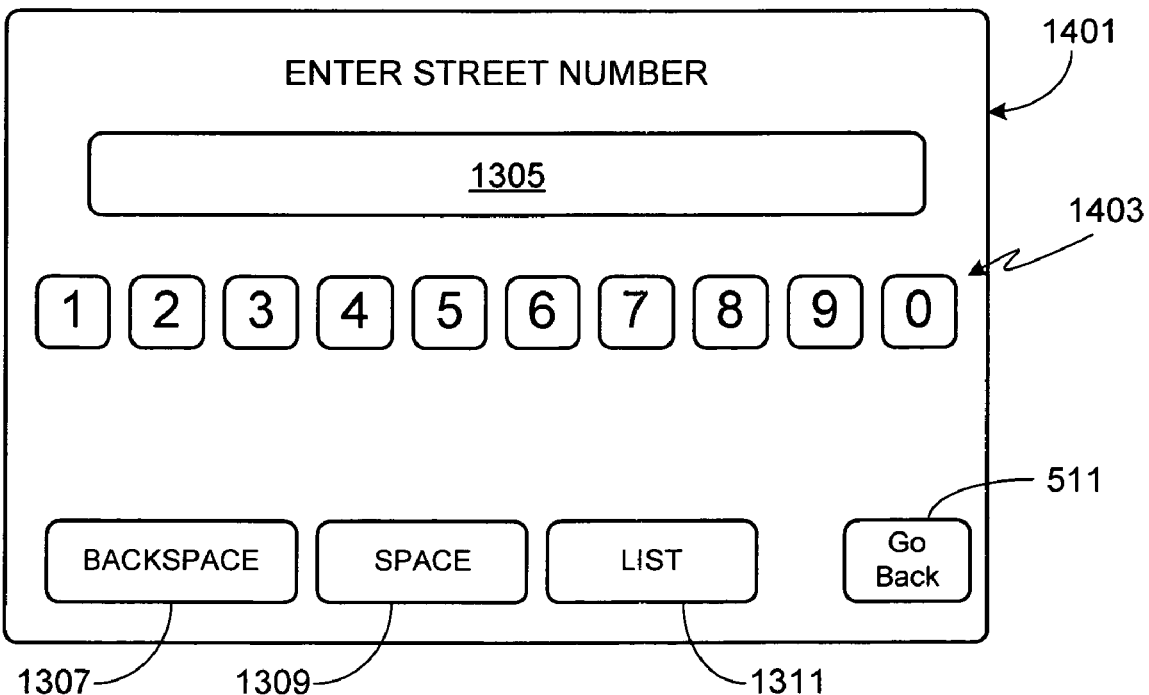
FIG. 14 illustrates a data screen for inputting a street number.

If the user wishes to input a specific location, they press or touch Address button 807 on a location input screen, causing secondary screen 1201 to be presented as shown in FIG. 12. From screen 1201 the user can choose to enter either the street address first via touch button 1203, or the city first via touch button 1205. Once the user selects either touch button 1203 or 1205, data input screen 1301 appears, providing the user with a touch keypad 1303. Keypad 1303 can use the key layout as shown, or use a Qwerty or other layout. As the user enters text via keypad 1303, the selected text appears on-screen at display region 1305. The keypad also includes a backspace key 1307 to delete incorrectly selected letters, a space key 1309, a list key 1311 that lists possible addresses based on the present input and using the database, and Go Back key 511 that causes the system to go back to the prior screen. Preferably as the user enters address data using keypad 1303, controller 301 searches an address database, for example stored in memory 311, for address names that match the provided information. This allows the system to provide the user with a list of likely matches, for example using list key 1311, or to complete an address when there is only a few matches or a single match. Once street and city information has been entered, preferably user screen 1401 is displayed, allowing the user to input a specific street number using keypad 1403.

Figure 15:
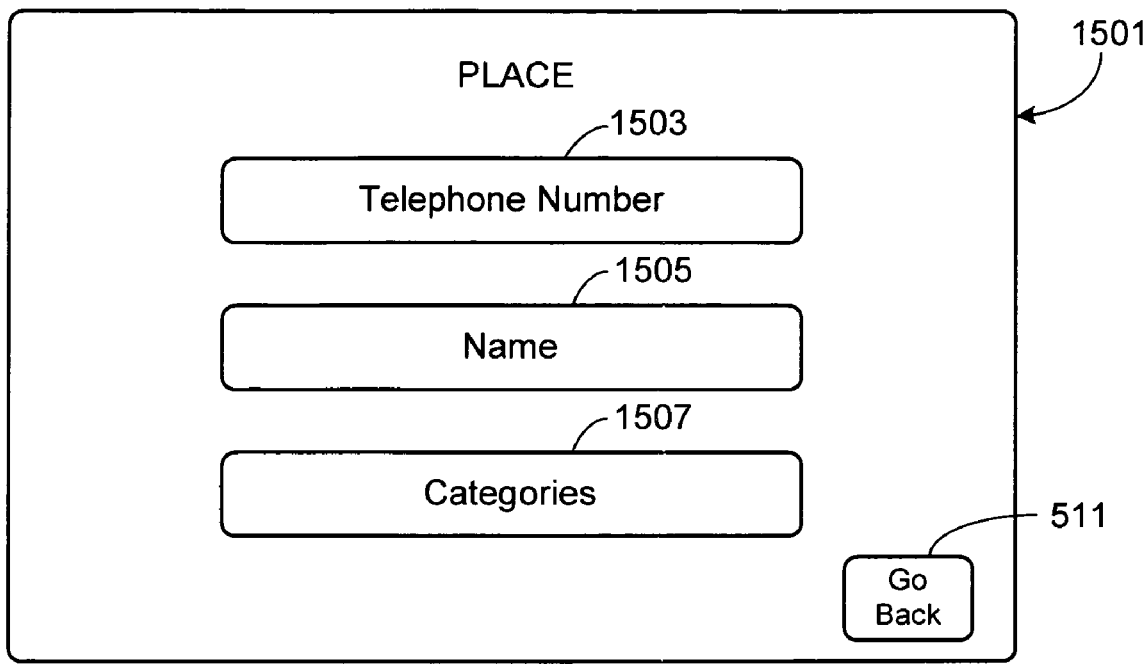
FIG. 15 illustrates a data screen for searching for a location by telephone number, name or category.
Figure 16:
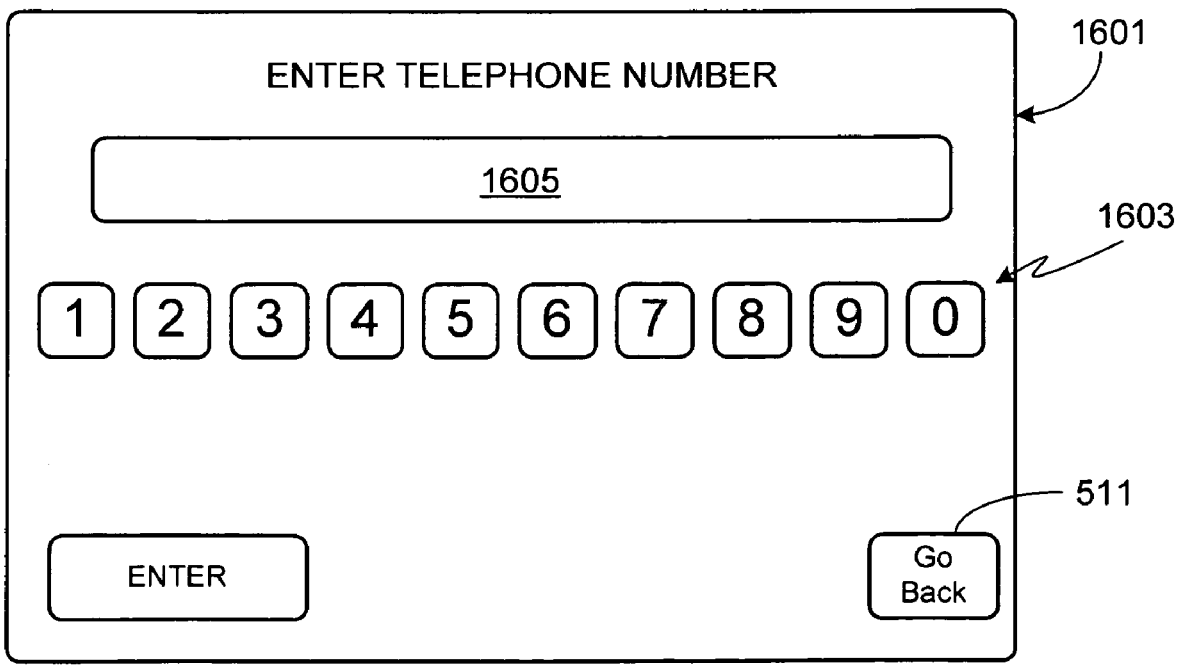
FIG. 16 illustrates a telephone number data input screen.
Figure 17:
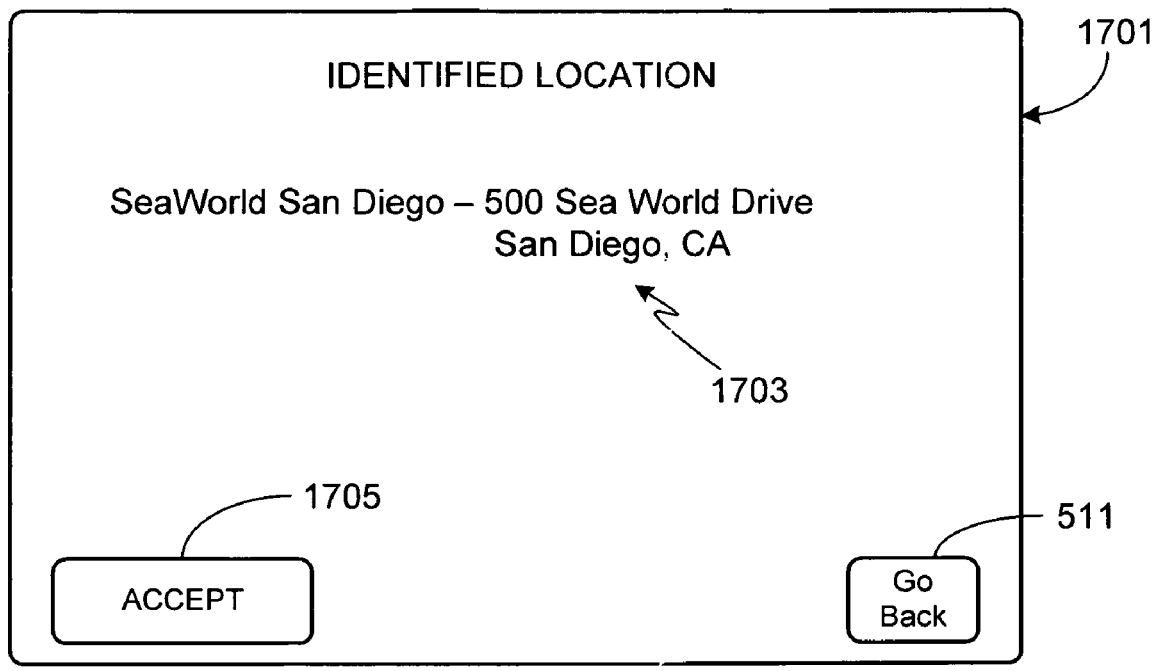
FIG. 17 illustrates a data screen for verifying the name and location of a place.
Figure 18:
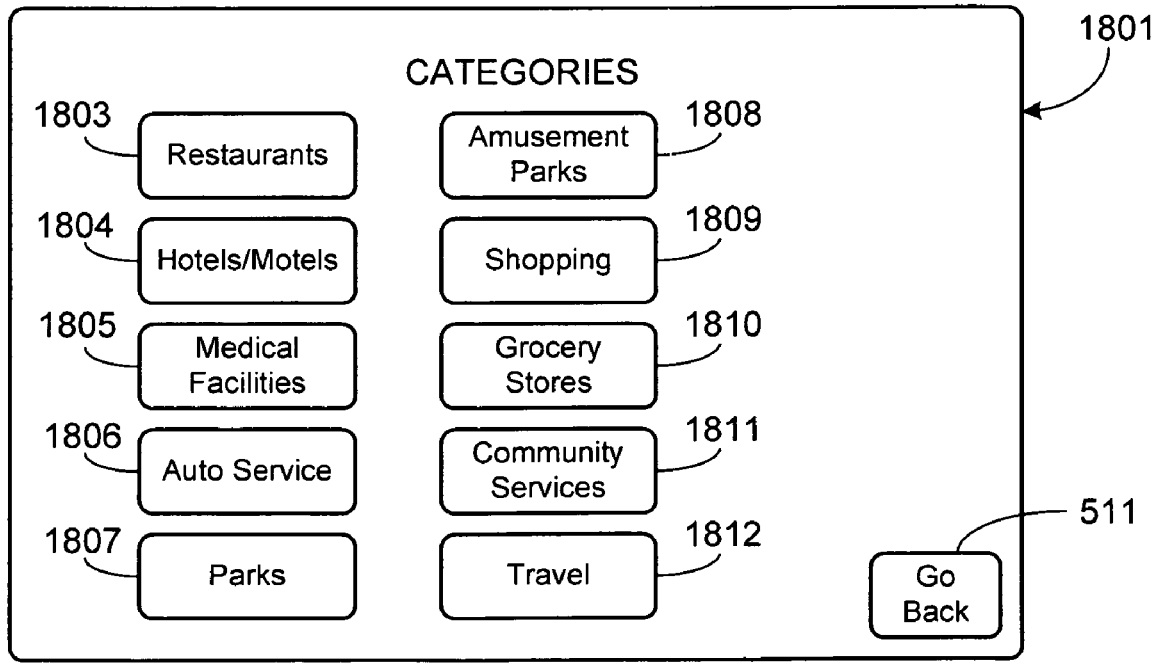
FIG. 18 illustrates categories for a category search screen.
Figure 19:
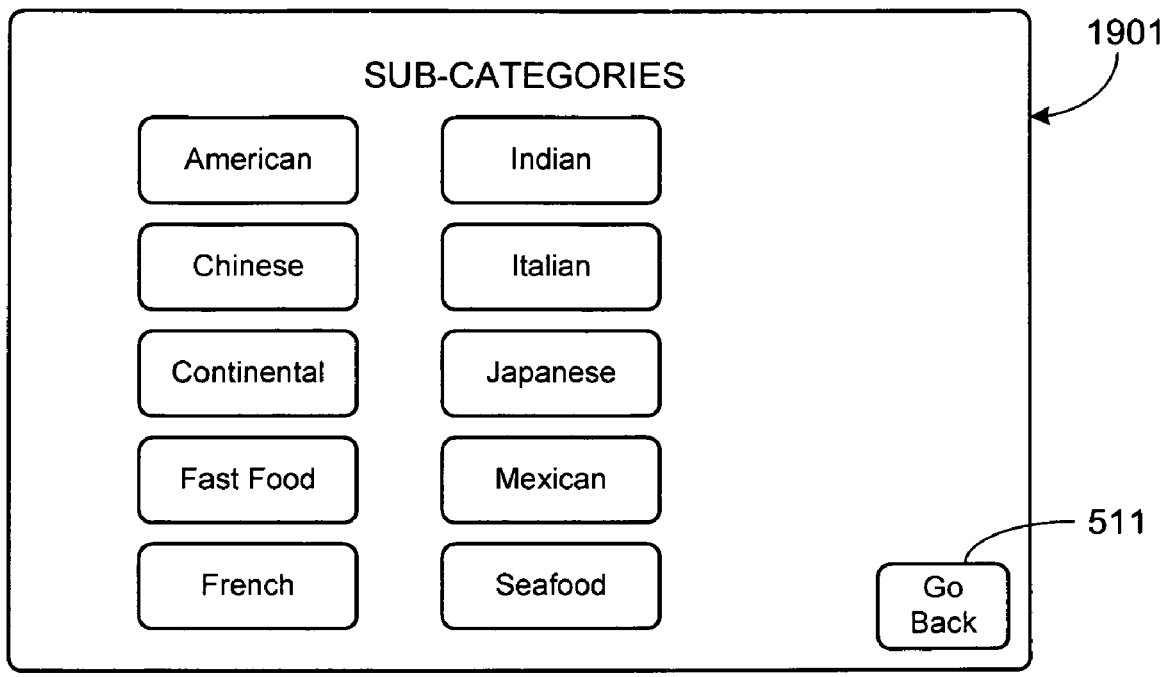
FIG. 19 illustrates sub-categories for a selected category.
Figure 20:
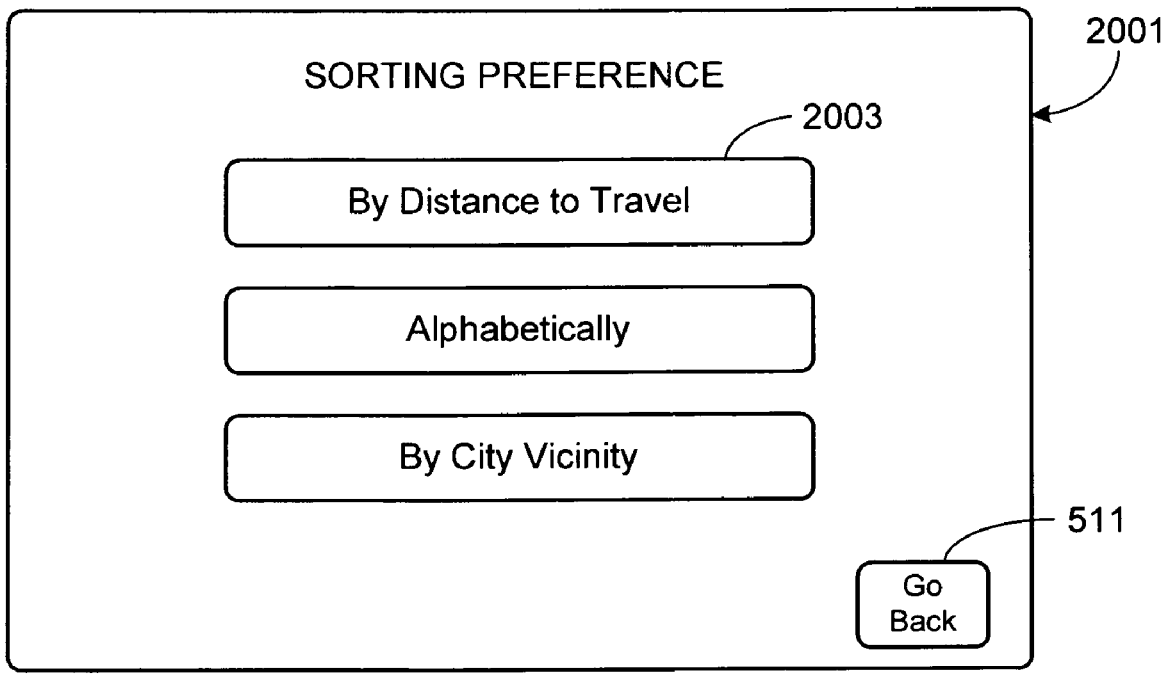
FIG. 20 illustrates a sorting preference input screen.

If the user does not know the specific address of a location they intend to drive to, they can press or touch Place button 809 on a location input screen, causing secondary screen 1501 to be presented as shown in FIG. 15. Screen 1501 allows the user to determine a place location by its telephone number (button 1503), its name (button 1505), or by searching for it through various categories (button 1507). Implementation of this method of entering data requires that controller 301 have access to a database as previously described.

If the user pushes or touches button 1503, a data input screen 1601 is displayed, allowing the user to enter a telephone number with keypad 1603. The number is displayed in display region 1605. Preferably if controller finds a match between the inputted number and a location in the database, the location and place name is presented to the user for verification using display region 1703 of screen 1701. The user can either accept the location by touching button 1705, or go back to screen 1501 by touching button 511.

If the user pushes or touches button 1505 on screen 1501, a data input screen such as screen 1301 is displayed, allowing the user to enter the name of the place in question. In response, controller 301 will display the location and place name on a screen such as screen 1701, thereby allowing the user to either accept the location or go back to screen 1501. If controller 301 finds several potential matches, preferably all potential matches are presented to the user so that the user can select the correct location, or go back to screen 1501.

If the user pushes or touches button 1507 on screen 1501, the system displays a screen 1801 that includes the available categories. It will be appreciated that different or additional categories can be presented, depending upon the system configuration, and that screen 1801 is only meant to be illustrative, not limiting. In exemplary screen 1801, touch buttons 1803-1812 correspond to Restaurants, Hotels/Motels, Medical Facilities, Auto Service, Parks, Amusement Parks, Shopping, Grocery Stores, Community Services, and Travel. When a category is selected, preferably the system displays a secondary screen that provides sub-categories for the selected category, thus helping to focus the user's search for the desired location. For example, if the user selects button 1803 on screen 1801, preferably screen 1901 displays various types of restaurants from which the user can select. Once the user selects a sub-category, or a category if no sub-categories are provided, preferably screen 2001 is displayed which requests the user to select how the identified locations/places are to be sorted. Alternately, the system can be configured to always list the identified locations/places in a preset manner, for example by distance to travel (button 2003), thus eliminating the need for screen 2001. Using the previously described database, the system then displays a screen (not shown) with a list of places/locations meeting the user selection criteria, each of which corresponds to its own touch button. As with prior location screens, e.g., screen 1101, the user selects the desired location by touching the button corresponding to the desired location. If the list of places/locations contains more locations than can be viewed on a single screen, scroll up and down buttons can be used to view additional locations. If the desired location is not on the list, the user can use the Go Back button to return to a prior input screen.

Figure 21:
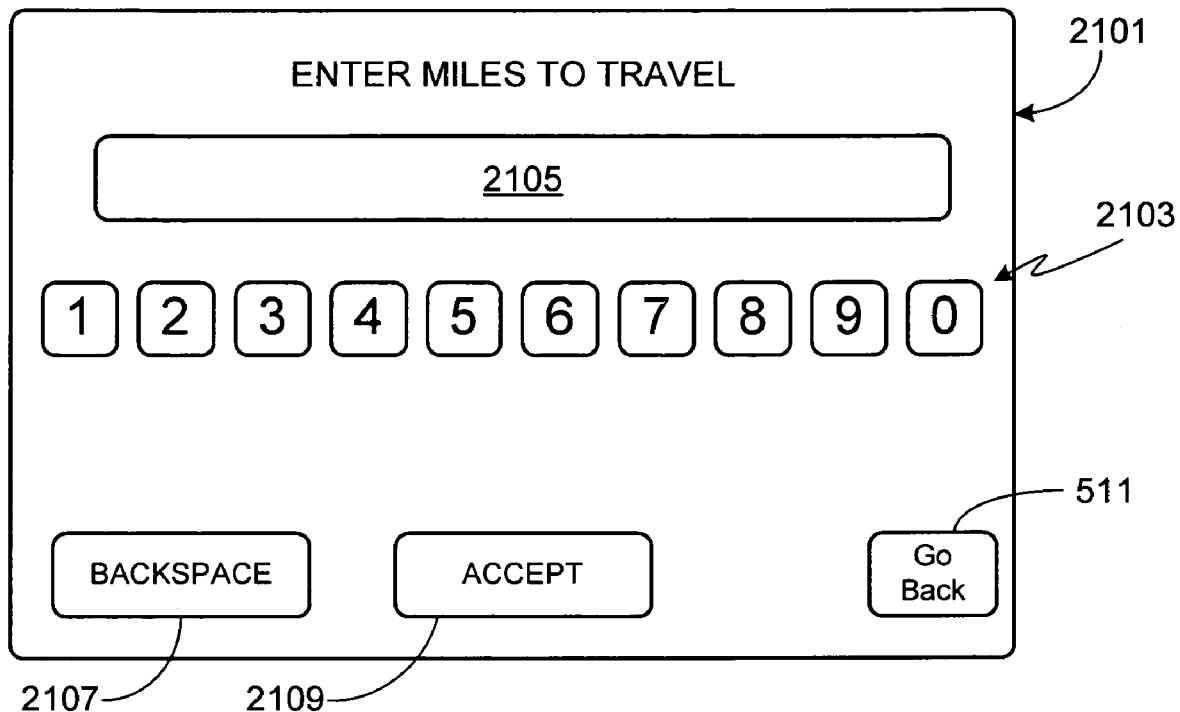
FIG. 21 illustrates a mileage data input screen.
Figure 22:
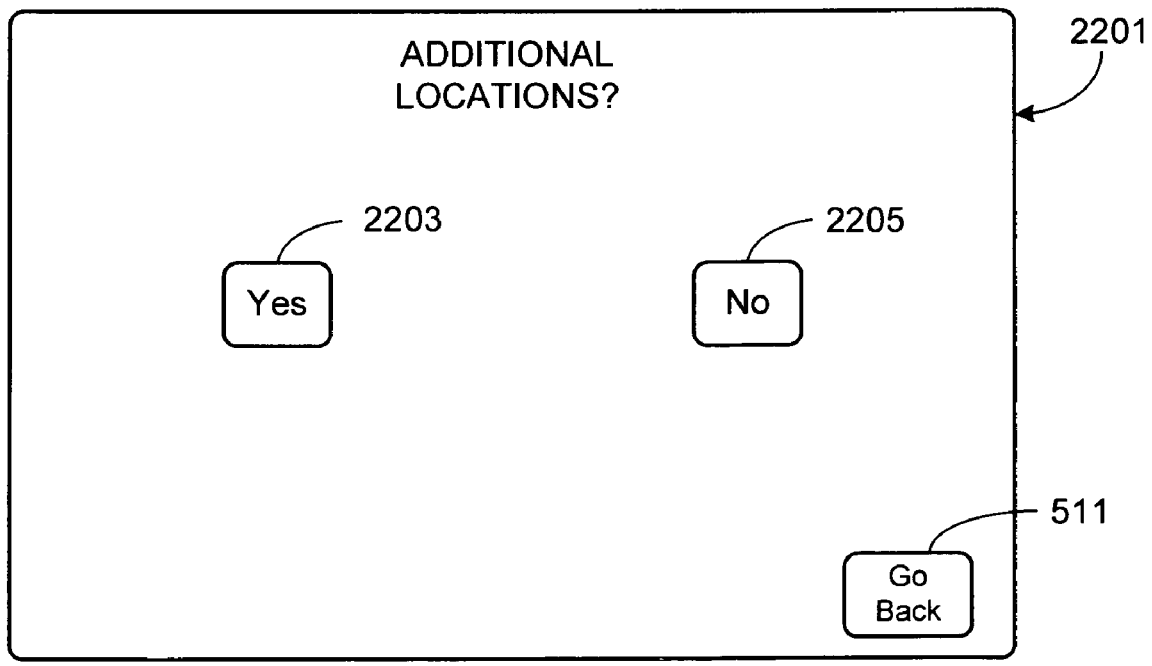
FIG. 22 illustrates a screen for verifying whether additional locations are to be input into the travel plan.
Figure 23:
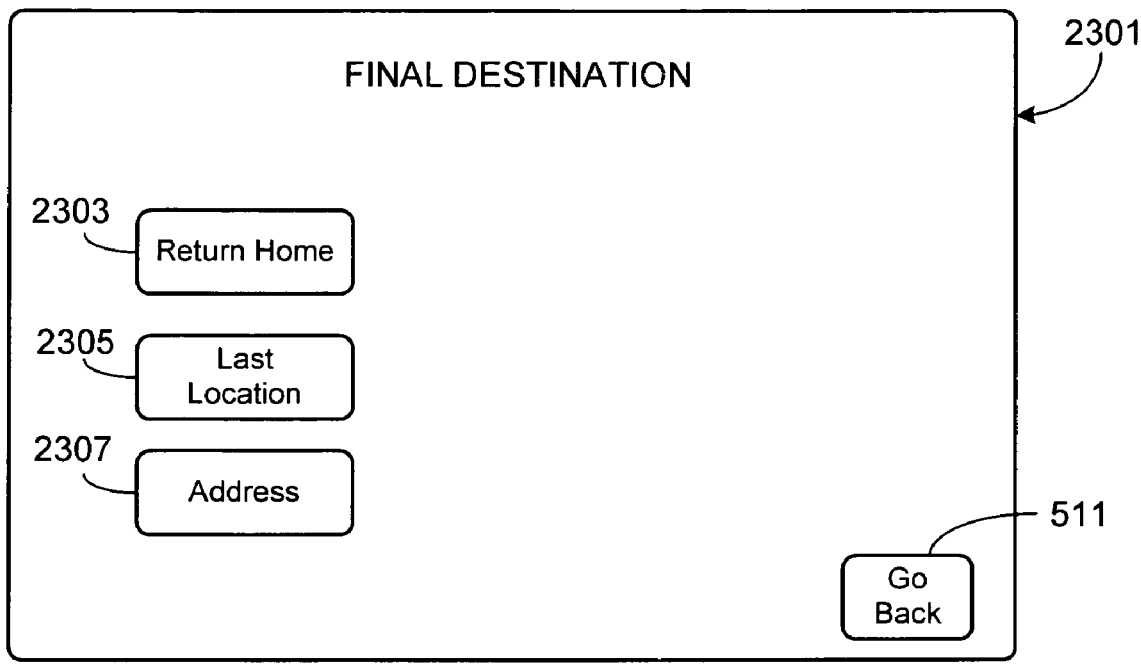
FIG. 23 illustrates a final destination input screen.

If the user does not wish to enter a specific travel destination, they can press or touch Miles button 811 on a location input screen, thereby allowing them to enter the destination based only on miles to travel. An exemplary data entry screen 2101 is shown in FIG. 21. Preferably screen 2101 includes a touch keypad 2103 for entering the desired number of miles, a display region 2105 that displays the data as entered, a Backspace button 2107 to delete incorrectly selected numerals, an Accept button 2109 that provides a means for the user to enter the selected number of miles, and a Go Back key 511 that causes the system to return to the prior screen. After the user enters the number of miles by pressing or touching button 2109, preferably the system displays a screen 2201 that verifies that the user does not wish to enter additional locations since in some instances the user may wish to enter miles plus one or more specific locations.

In order to calculate total travel miles, a final destination is required. The final destination is where the vehicle will go to at the end of the next driving period in order to be recharged. Display screen 2301 requests that the user enter the final destination, giving the user the options of selecting Return Home (button 2303), Last Location (button 2305) or Address (button 2307).

After the user has entered all expected travel locations for the next vehicle driving period, system controller 301 calculates the total travel miles (step 409), i.e., the total number of miles required to go from the starting point to the final destination and all locations in-between. Controller 301 then calculates the required electrical energy that must be stored in the battery to allow the vehicle to travel the total calculated travel miles (step 411), applying an electrical energy per mile conversion factor stored in memory 311 (e.g., 4.6 miles/kilowatt-hour). Although initially the electrical energy per mile conversion factor is set by the factory/dealer, preferably over time this conversion factor is updated to reflect the conversion efficiency obtained by that particular vehicle. Next, the current state of charge of battery 309 is determined (step 413), the current state of charge being the amount of electrical energy currently stored in the battery. Controller 301 then determines the additional electrical energy that must be added to the current state of charge so that the total stored electrical energy matches the previously calculated required electrical energy (step 415). Lastly, controller 301 sets-up charging system 305 with the charging conditions needed to meet those power requirements (step 417), specifically the charging conditions needed to increase the current state of charge to the total required electrical energy for the car to be able to follow the travel plan. Preferably the charging conditions set by controller 301 include setting the cut-off voltage used by charging system 305.

In the preferred embodiment illustrated in FIG. 4, prior to setting the charging conditions the processor calculates a power safety margin which is added to the electrical energy calculated in step 415 (step 419). The power safety margin is designed to insure that the vehicle is able to meet the needs of the user even if minor modifications are made to the driving plan or other unforeseen circumstances extend the needs placed on the battery system. Specifically, the power safety margin increases the electrical energy added, via the charging cycle, to battery 309.

In at least one embodiment, the battery power safety margin calculated in step 419 is configured by the car maker or the car dealer, the margin configured to add a percentage on top of the total calculated miles. For example, if the total calculated miles determined in step 409 is 100 miles, and the safety margin is 10%, then the system would use 110 miles as the basis for calculating the battery requirements. Similarly, the margin can be configured to add a percentage on top of the calculated battery power, i.e., if 20 kilowatt-hours are required to travel the desired distance and the margin is 10%, the total calculated battery requirements would be 22 kilowatt-hours.

Figure 24:
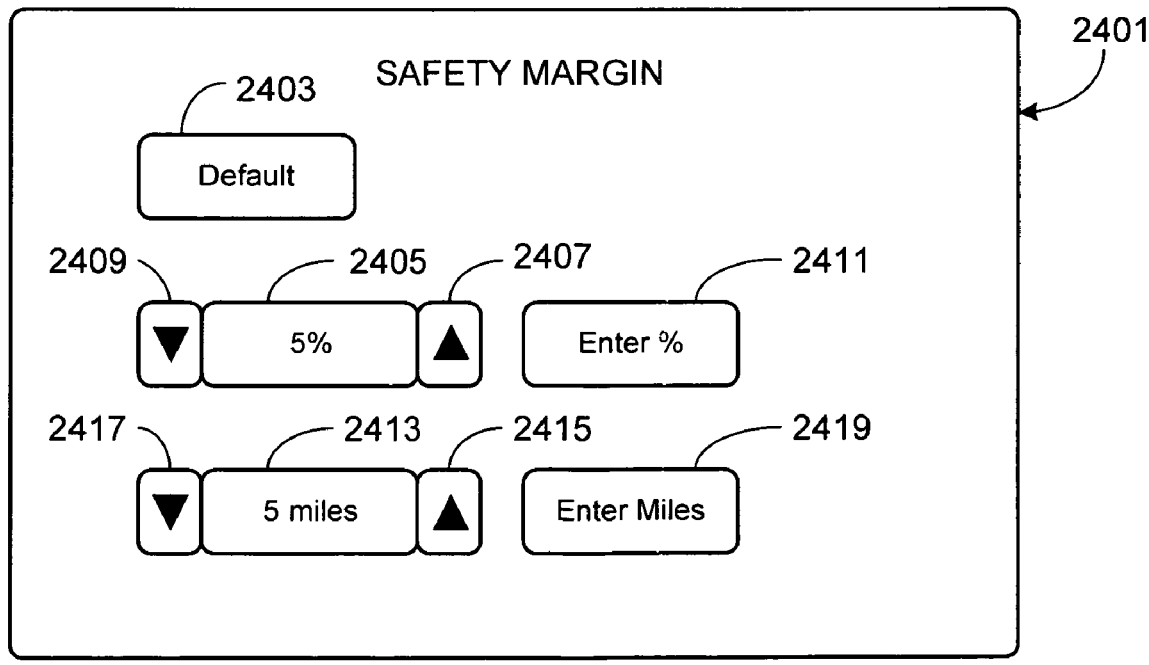
FIG. 24 illustrates a data screen for inputting a user set safety margin.

In at least one embodiment, the battery power safety margin is configurable by the user, thus allowing the user to vary the margin depending upon how risk adverse he or she is. For example, if the user is simply following the same work commute as every other work day, they may not feel the need for a very large safety margin. If, on the other hand, they are traveling to a location they have not been to before, they may wish to have a larger safety margin than normal. An exemplary safety margin input screen 2401 is shown in FIG. 24. As shown, the user is able to enter the safety margin in several different ways. By pressing or touching button 2403, a default safety margin is used. The default may be factory and/or dealer configured, or configured by the user during initial vehicle system set-up. Alternately, the user may enter a safety margin based on a percentage of the battery power calculated in step 411 using touch button 2405. A nominal value is shown which can be increased using up button 2407 or decreased using down button 2409. Preferably the value is varied in steps, e.g., 5%, 10%, 15%, etc., and does not allow the user to go below a preset value (e.g., 5%). Once the desired value has been selected, the user enters the value by touching or pressing on display button 2405. Alternately, an Enter button 2411 can be included on screen 2401. Alternately, the user may enter a safety margin using touch button 2413 that is based on the number of miles to be added to the total travel miles calculated in step 409. A nominal value is shown which can be increased using up button 2415 or decreased using down button 2417. Preferably the value is varied in steps, e.g., 5 miles, 10 miles, 15 miles, etc., and does not allow the user to go below a preset value (e.g., 5 miles). Once the desired value has been selected, the user enters the value by touching or pressing on display button 2413. Alternately, an Enter button 2419 can be included on screen 2401.

In at least one embodiment of the invention, after calculating the amount of electrical energy that must be stored in battery 309 to allow the vehicle to travel the total calculated travel miles (step 411), controller adds a battery pack reserve to the calculated battery power. The purpose of this reserve is different from the previously described safety margin. Rather, the purpose of this reserve is to insure that battery pack 309 is not fully discharged after completing the day's travel. As this purpose is also met by the safety margin, assuming that the entire safety margin is not required, in a preferred embodiment the system is configured to impose a minimum safety margin. For example, in one embodiment the minimum safety margin is 5 kilowatt-hours. Alternately, the system can be configured to impose a larger or smaller minimum safety margin.

Figure 25:
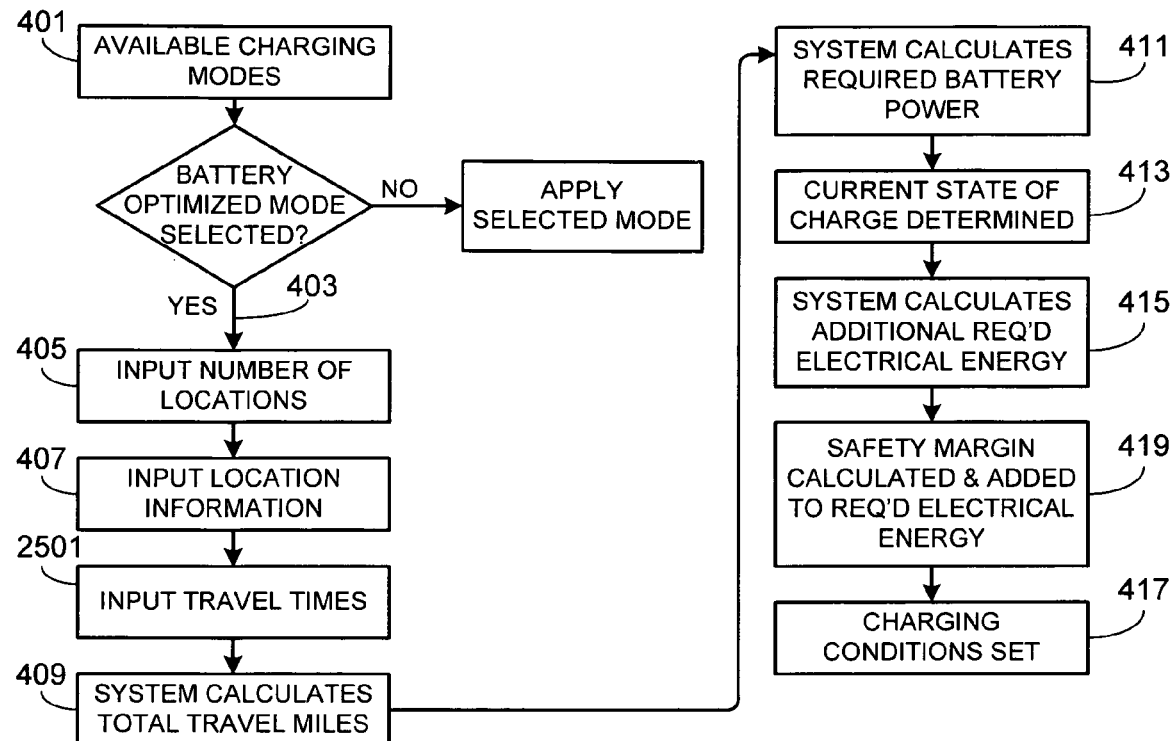
FIG. 25 illustrates the methodology of an alternate embodiment of the invention that includes travel times.
Figure 26:
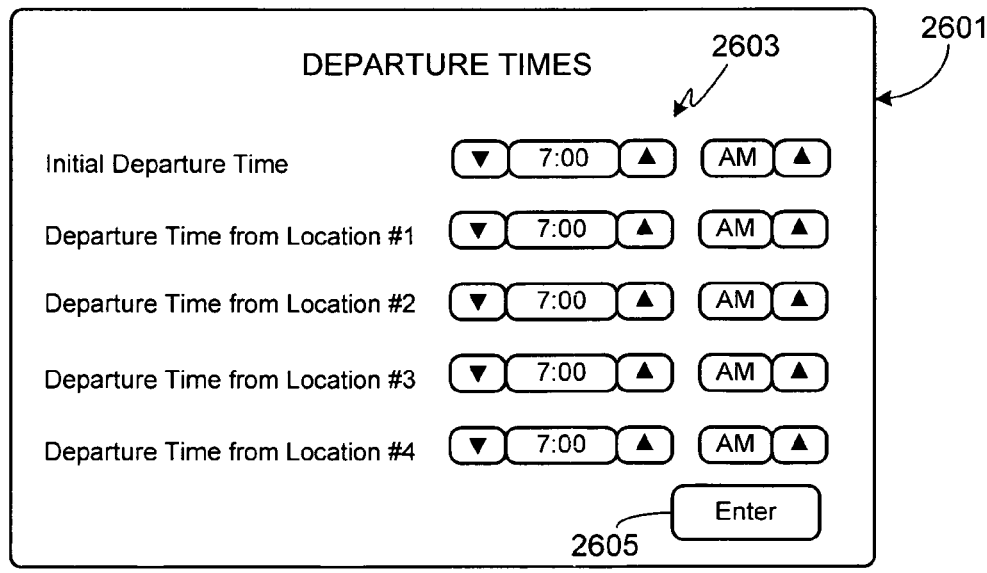
FIG. 26 illustrates a departure time input screen.
Figure 27:
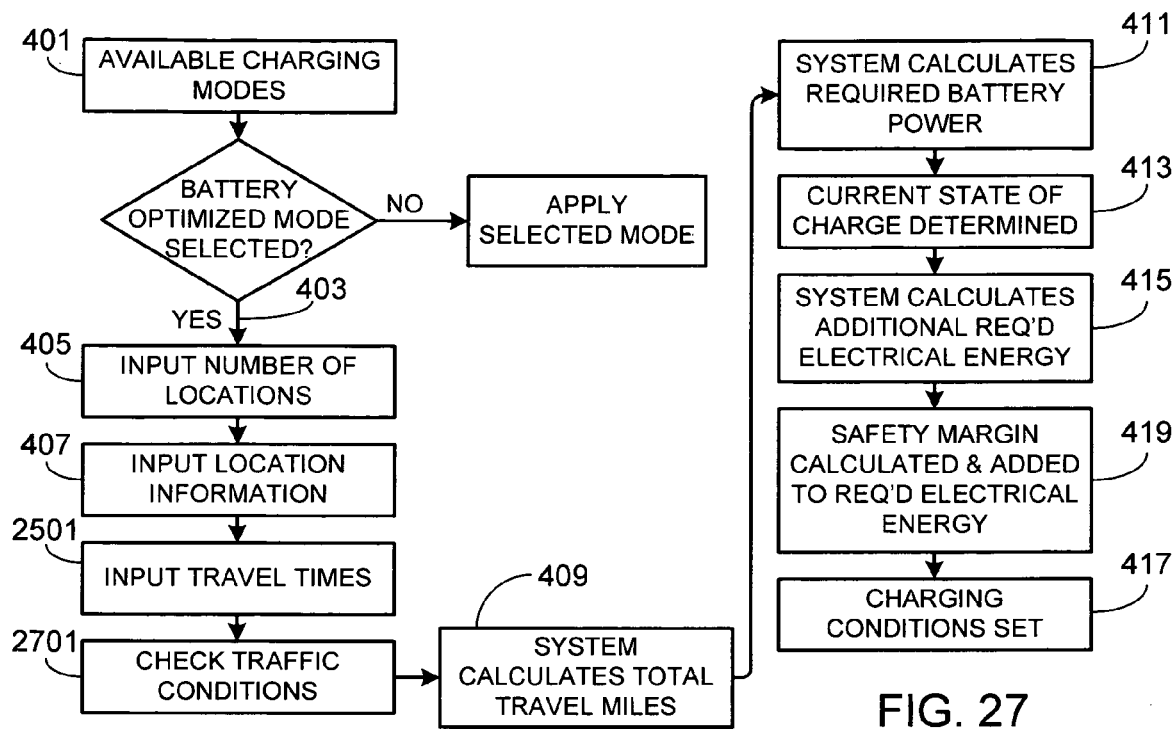
FIG. 27 illustrates the methodology of an alternate embodiment of the invention that modifies the battery charging conditions based on traffic conditions.
Figure 28:
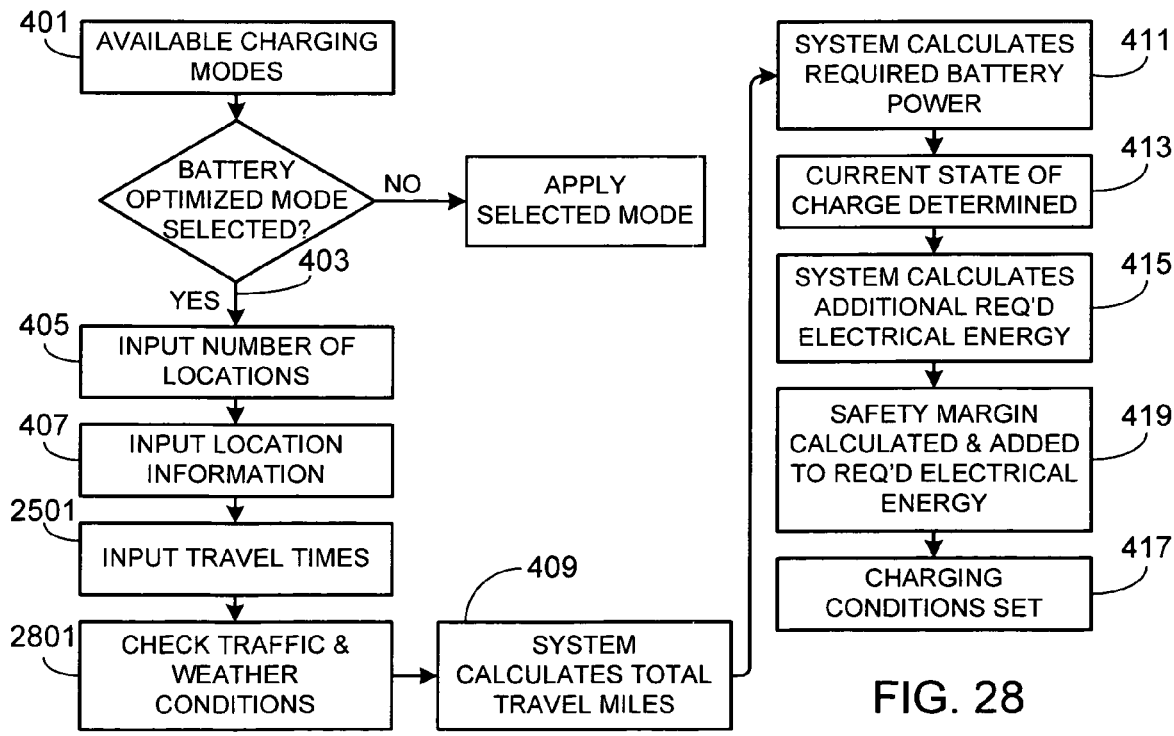
FIG. 28 illustrates the methodology of an alternate embodiment of the invention that modifies the battery charging conditions based on traffic and weather conditions.

In an alternate preferred embodiment, in addition to determining the battery requirements in light of the intended travel plans for the next driving period, the system is also configured to take into account varying traffic conditions. For example, in one embodiment in addition to obtaining the number and the locations of the places that the user intends to travel to during the next driving period (steps 405 and 407), the user also enters the intended travel time for each location (step 2501 in FIG. 25). This data can be input on the same screen as the location information, or on a separate screen or screens. For example, screen 2601 of FIG. 26 requests departure times for each location. In this example, the user is going to four locations before returning. The user selects the times for each departure using touch buttons 2603, and then enters the departure time data by touching button 2605. Controller 301 then uses this information to add additional battery capacity, as needed, depending upon the expected traffic conditions. For example, if the user is traveling during a period of time where traffic is expected to be very heavy, e.g., rush hour, controller 301 is configured to use a different electrical energy per mile conversion factor for that portion of the travel (for example, 3.6 miles/kilowatt-hour rather than 4.6 miles/kilowatt-hour).

It will be appreciated that there are numerous ways in which traffic conditions can be accounted for in the battery power calculations. For example in one approach, the car manufacturer and/or dealer inputs various electrical energy conversion efficiencies based on time, e.g., 90% for non-peak hours, 75% for peak travel hours, and 85% for times within 30 minutes of a peak travel hour with the manufacturer/dealer defining peak and non-peak hours. In an alternate approach, during vehicle set-up or at another time, the user inputs the various efficiencies as well as defining the impacted hours. Preferably the system is designed to aid the user in providing this information. For example, the system can ask the user, via the user interface, a series of questions that the system can then use to set-up suitable conversion efficiencies. Suitable questions can include asking the user to define the hours affected by rush-hour traffic and the degree to which commuting time is typically affected during those hours (e.g., very little, some, a lot, etc.). Controller 301 can then use a simple look-up table stored in memory 311 to translate the user's entries into conversion efficiencies that are applied during the battery power calculations.

In addition to taking into account predictable traffic conditions such as rush hour traffic, the present invention can also be configured to take into account non-predictable traffic conditions such as traffic detours, accidents, etc. This embodiment requires that controller 301 be in communication via an internal communication link with an external resource 313 that provides up-to-date road conditions. In one use of such information, after the user has input intended travel locations (step 407) and intended travel times (step 2501), the system checks external resource 313 to determine if any of the travel plans will be affected (step 2701), for example due to a road being closed for maintenance. Controller 301 then uses this information to determine route modifications that can affect travel miles and the outcome of step 409, or potential travel delays that can affect electrical energy conversion efficiencies and the outcome of step 411. As a result, the traffic conditions directly influence the calculated battery charging requirements.

Weather conditions can affect the user's travel plans, and thus the battery charging requirements, in a manner similar to that of varying traffic conditions. Accordingly in at least one embodiment of the invention, external resource 313 provides up-to-date weather conditions, either in addition to, or as a substitute for, up-to-date road conditions. In a preferred embodiment of the invention, after the user has input intended travel locations (step 407) and intended travel times (step 2501), controller 301 checks external resource 313 to determine if any of the intended travel plans may be affected due to road or weather conditions (step 2801). Controller 301 then uses this information to determine if route modifications are required that can affect travel miles and the outcome of step 409, or potential travel delays that can affect electrical energy conversion efficiencies and the outcome of step 411. The ambient temperature can also affect the driving range, because higher temperature reduces cell impedance and leads to a greater driving range. Thus the calculated battery charging requirements are based on the user's travel plans as possibly modified due to road and/or weather conditions.

Figure 29:
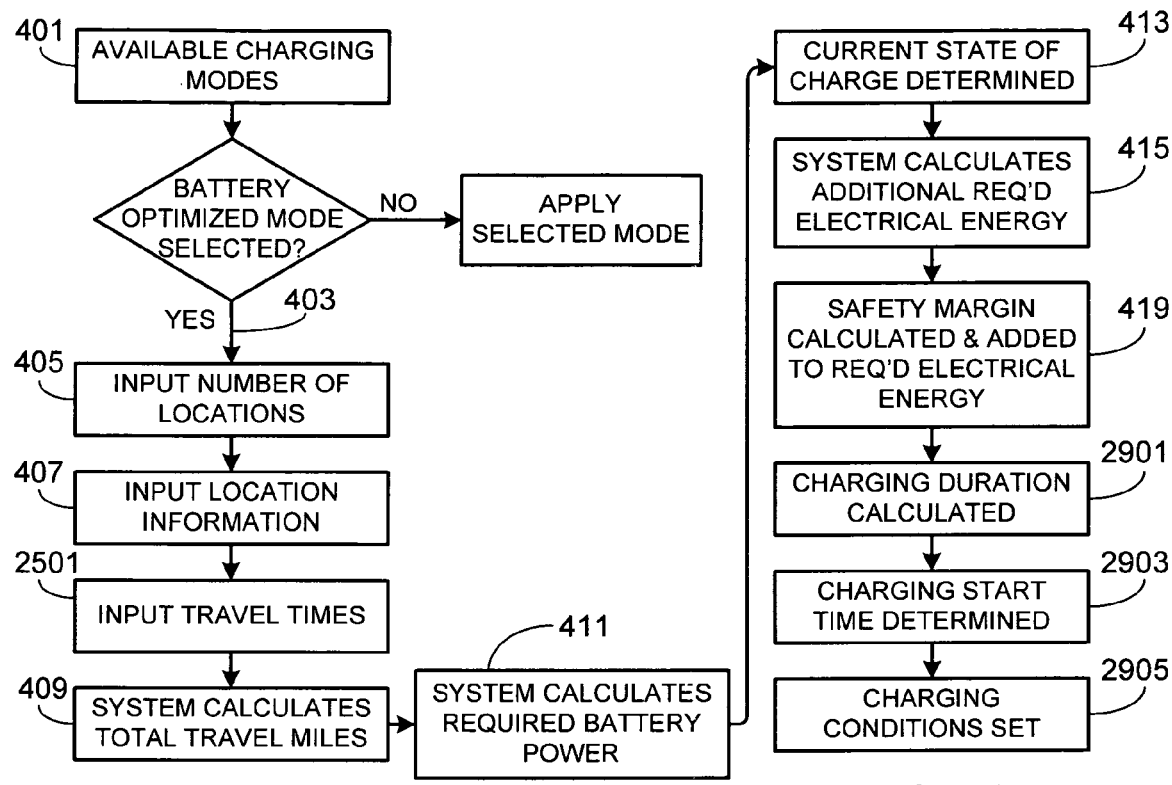
FIG. 29 illustrates the methodology of an alternate embodiment of the invention in which the battery charging period is set as well as the charging conditions.
Figure 30:
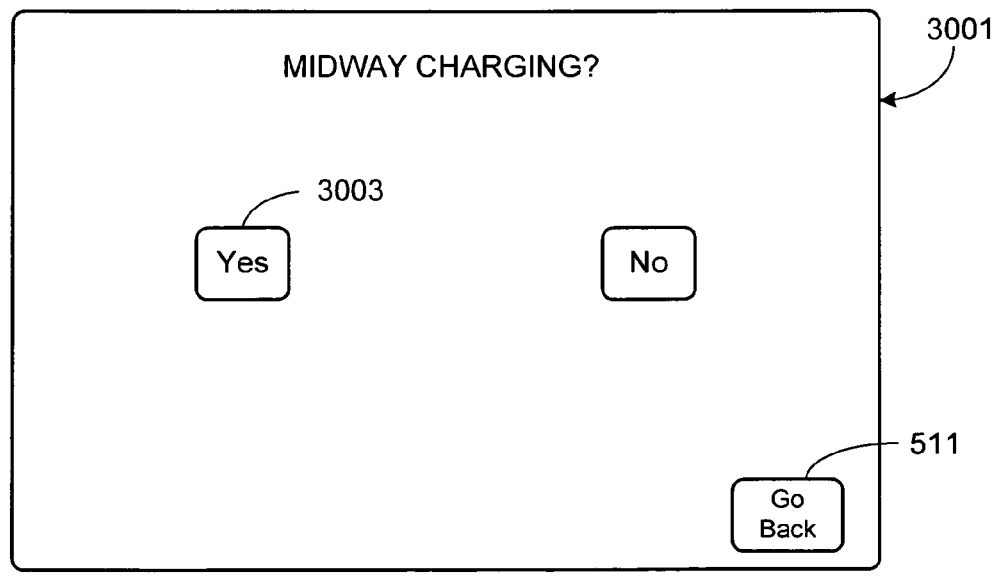
FIG. 30 illustrates a data screen for inputting information about battery charging during the travel day.
Figure 31:
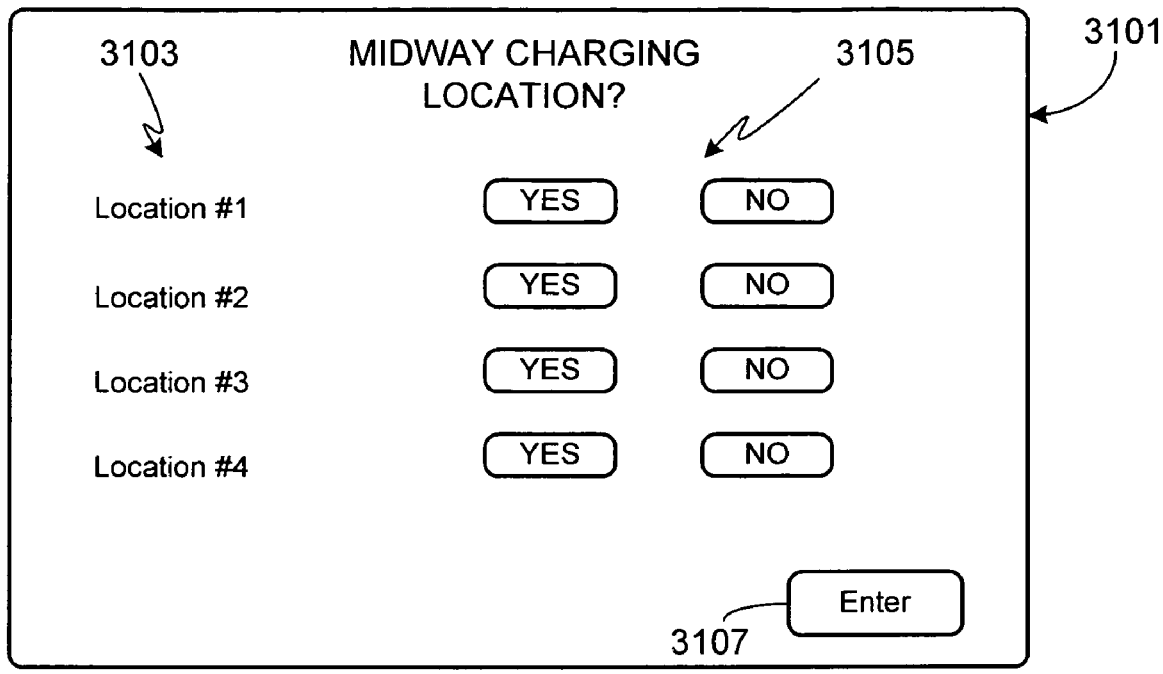
FIG. 31 illustrates a data screen for inputting the locations at which midway charging is expected.
Figure 32:
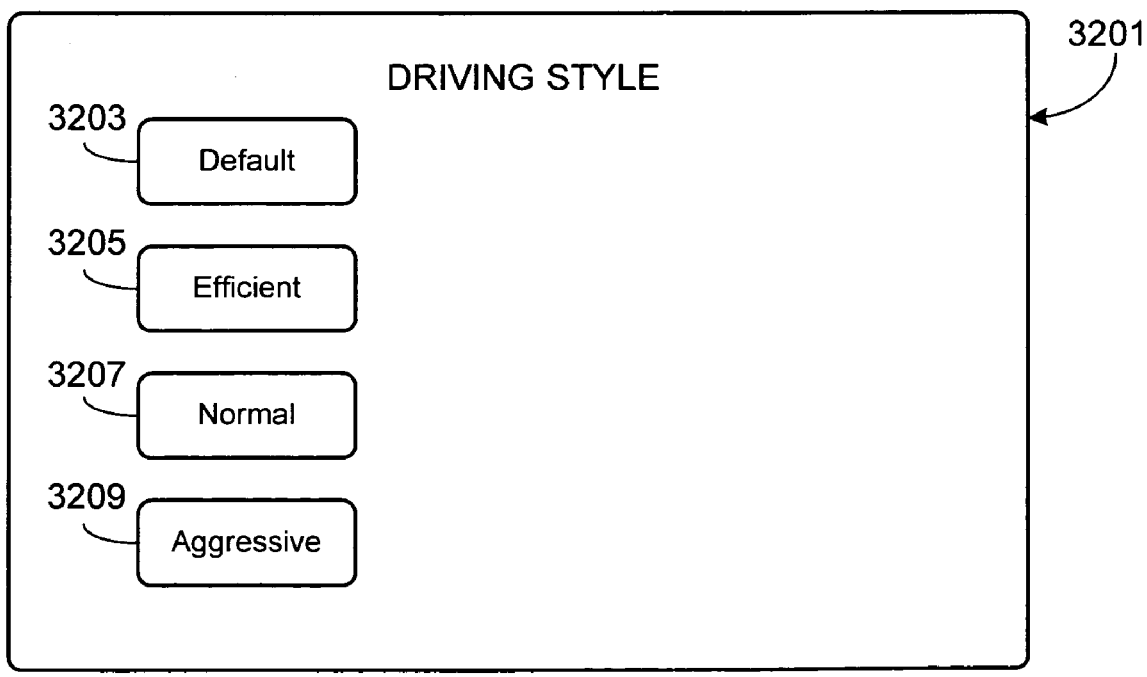
FIG. 32 illustrates a driving style input screen.

In addition to limiting battery charging levels to those needed to meet the travel plans of the user, preferably the present invention also increases battery life by limiting the length of time that the battery pack is maintained at a high charge level. For example, in at least one embodiment, the initial departure time information is used to set when the charging occurs. As illustrated in FIG. 29, after calculating the battery requirements (step 415), controller 301 determines how long the charging cycle will take (step 2901). Then using the initial departure time (step 2501) as the starting point, controller 301 determines how long before the departure time charging must be initiated (step 2903) in order to have the charging cycle completed by the departure time. Preferably controller 301 adds a time safety margin to the charging cycle start time, for example an hour, thereby insuring that the car is charged to the appropriate level when the user is ready to leave, even if the user decides to depart a little early. Preferably the system allows the user to set the time safety margin although in at least one embodiment the time safety margin is preset by the car manufacturer or the car dealer. The charging start time is then set along with other charging conditions in step 2905.

In addition to setting the charging cycle start time based on the calculated charging requirements and the entered initial departure time, preferably the system also takes into account variations in electricity cost. This aspect can be very important from a cost point of view if the user lives in a region where the cost of electricity varies depending upon the time of day. For example, a user may pay 5 cents per kilowatt hour from midnight through 7 AM, 10 cents per kilowatt hour from 7 AM through 2 PM and from 9 PM through midnight, and 29 cents per kilowatt hour from 2 PM through 9 PM. In this embodiment, the costs of electricity based on time can be input by the user, for example using interface 303, or the system may be configured to find this information through an external resource 313. External resource 313 can be, for example, a database containing the cost of electricity for specific regions and during specific hours. In this embodiment, controller 301 uses a simple algorithm to determine appropriate charging conditions based on these cost differentials as well as the amount of charging required to meet the day's travel plans, the effects on battery life, and the initial departure time. For example, controller 301 may require that all charging occur during non-peak hours, thus minimizing recharging costs.

In an alternate preferred embodiment, the system takes into account charging that occurs during the day, i.e., part way through the day's travels. This embodiment is especially useful for a user who routinely takes their car to the same location, e.g., work, and charges the car at that location. Typically in this embodiment after inputting locations, and inputting departure times if the embodiment utilizes such information, the user inputs whether or not they intend to charge battery pack 309 at anytime during the day (screen 3001). If the user presses or touches button 3003, the system presents screen 3101 in which the previously entered travel destinations are displayed (display 3103). For each location the user is asked to specify whether charging will occur at that location using Yes and No buttons 3105. Button 3107 is pressed after selecting the recharging locations. Controller 301 then sets the charging conditions for each location, as well as the initial location, based on this information.

In at least one embodiment using midway charging, the system is configured to take into account differences between charging stations. One of the primary differences that are likely to occur between charging stations is the cost of the electricity. For example, at home the user may pay 6 cents per kilowatt hour while at work the cost may jump to 20 cents per kilowatt hour since the user's employer may add a surcharge to the cost of the electricity. Alternately, the user's employer may offer free recharging as an incentive to use alternative energy vehicles. These types of differences can be input by the user, for example using interface 303, or the system may be configured to find this information through an external resource 313. External resource 313 can be, for example, a database containing recharging locations and recharging costs. Preferably controller 301 uses a simple algorithm to determine appropriate charging conditions based on cost differentials, the amount of charging required to meet the day's travel plans, and the effects on battery life.

As previously noted, variations in driving style are taken into account by the system, in at least some embodiments, by using an electrical energy per mile conversion factor that is updated over time to reflect the conversion efficiency obtained by that particular vehicle. In at least one embodiment of the invention, the user is able to input the driving style expected during the next driving period. For example, while gathering information to be used in calculating battery charging requirements, screen 3201 can be presented via interface 303. As shown, screen 3201 requires the user to select between Default (button 3203), Efficient (button 3205), Normal (button 3207) and Aggressive (button 3209). If Default is selected, controller 301 uses the electrical energy per mile conversion factor stored in memory 311. Although different conversion factors can be stored for the other three driving styles, preferably for each driving style the default conversion factor is used with a multiplier. For example, for the Efficient style the multiplier can be set at 1.05, for the Normal style the multiplier can be set at 1.00, and for the Aggressive style the multiplier can be set at 0.95.

As previously noted, user interface 303 can utilize a variety of interface types, although preferably a touch-sensitive display is used or a simple display screen with a plurality of corresponding switches. Additionally, it should be appreciated that the display screens provided herein are only meant to illustrate the invention, not limit the invention, and that the inventors envision that the data required to implement the invention can be gathered using a variety of different means. For example, if user interface 303 includes a communication link as described in detail in co-pending U.S. patent application Ser. No. 11/818,838, filed Jun. 15, 2007 and Ser. No. 11/779,678, filed Jul. 18, 2007, the disclosures of which are incorporated herein for any and all purposes, then the data required to implement the present invention can be input via a computer or other means in communication with the vehicle's communication link via a known network system such as a cellular, internet, satellite, or other system.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. An electric vehicle battery charging system, comprising:
a user interface configured for entering a travel plan for a driving period, said travel plan including at least one location and at least one location departure time;
a charging system controller coupled to said user interface and configured to calculate total travel miles for said driving period based on said travel plan, said charging system controller further configured to calculate battery pack electrical energy requirements for a battery pack of an electric vehicle based on said calculated total travel miles and a miles-to-electrical energy conversion factor, wherein said miles-to-electrical energy conversion factor varies based on said at least one location departure time, and said charging system controller further configured to set battery pack charging conditions based on said calculated battery pack electrical energy requirements and based on a current state of charge of said battery pack; and
a configurable battery pack charging system coupled to said charging system controller, said battery pack and a power source, wherein said configurable battery pack charging system charges said battery pack in accordance with said battery pack charging conditions set by said charging system controller.

2. The electric vehicle battery charging system of claim 1, wherein said user interface is comprised of a touch-sensitive screen integrated within said electric vehicle.

3. The electric vehicle battery charging system of claim 1, further comprising a system memory coupled to said charging system controller, said system memory storing battery pack data and said miles-to-electrical energy conversion factors.

4. The electric vehicle battery charging system of claim 1, further comprising a system memory coupled to said charging system controller, said system memory storing a location database, wherein said charging system controller is configured to allow it to search said location database.

5. The electric vehicle battery charging system of claim 1, said charging system controller further configured to calculate a battery power safety margin, wherein said charging system controller calculates said battery pack requirements based on said calculated total travel miles, said miles-to-electrical energy conversion factor, said current state of charge of said battery pack and said battery power safety margin.

6. A method of charging a battery pack of an electric vehicle, the method comprising the steps of:
inputting a travel plan into a battery pack charging controller using a user interface, wherein said travel plan is comprised of location information and location departure time information;

calculating a total travel miles corresponding to said travel plan;

determining a present battery pack state of charge, wherein said present battery pack state of charge corresponds to a first quantity of electrical energy stored within said battery pack;

converting said total travel miles to a second quantity of electrical energy using a miles-to-electrical conversion factor, wherein said second quantity of electrical energy corresponds to a level of electrical energy required to be stored in the battery pack for the electric vehicle to travel said total travel miles, and wherein said miles-to-electrical conversion factor varies with said location departure time information;

calculating a third quantity of electrical energy, wherein said third quantity of electrical energy corresponds to the difference between said second quantity of electrical energy and said first quantity of electrical energy;

determining a set of battery pack charging conditions, wherein said set of battery pack charging conditions is based on said third quantity of electrical energy;

inputting said set of battery pack charging conditions into an electric vehicle charging system; and charging the battery pack of the electric vehicle with said electric vehicle charging system in accordance with said set of battery pack charging conditions.

7. The method of claim 6, wherein said battery pack charging controller is an on-board battery pack charging controller, and wherein said on-board battery pack charging controller performs said steps of calculating said total travel miles, converting said total travel miles to said second quantity of electrical energy, calculating said third quantity of electrical energy, determining said set of battery pack charging conditions, and inputting said set of battery pack charging conditions into said electric vehicle charging system.

8. The method of claim 6, wherein said step of determining a set of battery pack charging conditions further comprises the step of setting a cut-off voltage.

9. The method of claim 6, further comprising the step of calculating a battery power safety margin, wherein said battery power safety margin corresponds to a fourth quantity of electrical energy, and wherein said set of battery pack charging conditions is based on said third quantity of electrical energy and on said fourth quantity of electrical energy.

10. The method of claim 9, further comprising the step of setting a minimum battery power safety margin.

11. The method of claim 6, further comprising the steps of inputting a battery power safety margin using said user interface, converting said battery power safety margin to a fourth quantity of electrical energy, and wherein said set of battery pack charging conditions is based on said third quantity of electrical energy and on said fourth quantity of electrical energy.

12. The method of claim 6, said method further comprises the steps of;

determining a battery pack charging start time based on said location departure time information and said set of battery pack charging conditions;

inputting said battery pack charging start time into said electric vehicle charging system; and initiating said battery pack charging step in response to said battery pack charging start time.

13. The method of claim 12, further comprising the step of inputting electricity cost as a function of usage time data into said battery pack charging controller, wherein said battery pack charging start time determining step is based on said location departure time information, said set of battery pack charging conditions and on said electricity cost as a function of usage time data.

14. The method of claim 12, further comprising the step of obtaining electricity cost as a function of usage time data, wherein said electricity cost as a function of usage time data obtaining step is performed by said battery pack charging controller, and wherein said battery pack charging start time determining step is based on said location departure time information, said set of battery pack charging conditions and on said electricity cost as a function of usage time data.

15. The method of claim 6, further comprising the step of inputting mid-travel recharging information into said battery pack charging controller using said user interface, wherein said set of battery pack charging conditions is based on said third quantity of electrical energy and on said mid-travel recharging information.

16. The method of claim 6, further comprising the step of inputting driving style information into said battery pack charging controller using said user interface, wherein said set of battery pack charging conditions is based on said third quantity of electrical energy and on said driving style information.

17. An electric vehicle battery charging system, comprising:

a user interface configured for entering a travel plan for a driving period, said travel plan including at least one location;

a charging system controller coupled to said user interface and configured to calculate total travel miles for said driving period based on said travel plan, said charging system controller further configured to calculate battery pack electrical energy requirements for a battery pack of an electric vehicle based on said calculated total travel miles and a miles-to-electrical energy conversion factor, and said charging system controller further configured to set battery pack charging conditions based on said calculated battery pack electrical energy requirements and based on a current state of charge of said battery pack;

a communication link coupled to an external source of road and traffic conditions, wherein said miles-to-electrical energy conversion factor varies based on said road and traffic conditions; and a configurable battery pack charging system coupled to said charging system controller, said battery pack and a power source, wherein said configurable battery pack charging system charges said battery pack in accordance with said battery pack charging conditions set by said charging system controller.

18. The electric vehicle battery charging system of claim 17, wherein said user interface is comprised of a touch-sensitive screen integrated within said electric vehicle.

19. The electric vehicle battery charging system of claim 17, further comprising a system memory coupled to said charging system controller, said system memory storing battery pack data and said miles-to-electrical energy conversion factors.

20. The electric vehicle battery charging system of claim 17, further comprising a system memory coupled to said charging system controller, said system memory storing a location database, wherein said charging system controller is configured to allow it to search said location database.

21. The electric vehicle battery charging system of claim 17, said charging system controller further configured to calculate a battery power safety margin, wherein said charging system controller calculates said battery pack requirements based on said calculated total travel miles, said miles-to-electrical energy conversion factor, said current state of charge of said battery pack and said battery power safety margin.

22. An electric vehicle battery charging system, comprising:
- a user interface configured for entering a travel plan for a driving period, said travel plan including at least one location;
- a charging system controller coupled to said user interface and configured to calculate total travel miles for said driving period based on said travel plan, said charging system controller further configured to calculate battery pack electrical energy requirements for a battery pack of an electric vehicle based on said calculated total travel miles and a miles-to-electrical energy conversion factor, and said charging system controller further configured to set battery pack charging conditions based on said calculated battery pack electrical energy requirements and based on a current state of charge of said battery pack;
- a communication link coupled to an external source of weather conditions, wherein said miles-to-electrical energy conversion factor varies based on said weather conditions; and
- a configurable battery pack charging system coupled to said charging system controller, said battery pack and a power source, wherein said configurable battery pack charging system charges said battery pack in accordance with said battery pack charging conditions set by said charging system controller.

23. The electric vehicle battery charging system of claim 22, wherein said user interface is comprised of a touch-sensitive screen integrated within said electric vehicle.

24. The electric vehicle battery charging system of claim 22, further comprising a system memory coupled to said charging system controller, said system memory storing battery pack data and said miles-to-electrical energy conversion factors.

25. The electric vehicle battery charging system of claim 22, further comprising a system memory coupled to said charging system controller, said system memory storing a location database, wherein said charging system controller is configured to allow it to search said location database.

26. The electric vehicle battery charging system of claim 22, said charging system controller further configured to calculate a battery power safety margin, wherein said charging system controller calculates said battery pack requirements based on said calculated total travel miles, said miles-to-electrical energy conversion factor, said current state of charge of said battery pack and said battery power safety margin.

27. A method of charging a battery pack of an electric vehicle, the method comprising the steps of:
- inputting a travel plan into a battery pack charging controller using a user interface, wherein said travel plan is comprised of location information;
- obtaining road and traffic condition information, wherein said road and traffic condition information obtaining step is performed by said battery pack charging controller;
- calculating a total travel miles corresponding to said travel plan;
- determining a present battery pack state of charge, wherein said present battery pack state of charge corresponds to a first quantity of electrical energy stored within said battery pack;
- converting said total travel miles to a second quantity of electrical energy using a miles-to-electrical conversion factor, wherein said second quantity of electrical energy corresponds to a level of electrical energy required to be stored in the battery pack for the electric vehicle to travel said total travel miles, and wherein said miles-to-electrical conversion factor varies based on said road and traffic condition information;
- calculating a third quantity of electrical energy, wherein said third quantity of electrical energy corresponds to the difference between said second quantity of electrical energy and said first quantity of electrical energy;
- determining a set of battery pack charging conditions, wherein said set of battery pack charging conditions is based on said third quantity of electrical energy;
- inputting said set of battery pack charging conditions into an electric vehicle charging system; and
- charging the battery pack of the electric vehicle with said electric vehicle charging system in accordance with said set of battery pack charging conditions.

28. The method of claim 27, wherein said battery pack charging controller is an on-board battery pack charging controller, and wherein said on-board battery pack charging controller performs said steps of calculating said total travel miles, converting said total travel miles to said second quantity of electrical energy, calculating said third quantity of electrical energy, determining said set of battery pack charging conditions, and inputting said set of battery pack charging conditions into said electric vehicle charging system.

29. The method of claim 27, wherein said step of determining a set of battery pack charging conditions further comprises the step of setting a cut-off voltage.

30. The method of claim 27, further comprising the step of calculating a battery power safety margin, wherein said battery power safety margin corresponds to a fourth quantity of electrical energy, and wherein said set of battery pack charging conditions is based on said third quantity of electrical energy and on said fourth quantity of electrical energy.

31. The method of claim 30, further comprising the step of setting a minimum battery power safety margin.

32. The method of claim 30, further comprising the steps of inputting a battery power safety margin using said user interface, converting said battery power safety margin to a fourth quantity of electrical energy, and wherein said set of battery pack charging conditions is based on said third quantity of electrical energy and on said fourth quantity of electrical energy.

33. The method of claim 27, wherein said step of inputting said travel plan into said battery pack charging controller further comprises the step of inputting location departure time information into said battery pack charging controller using said user interface, and wherein said method further comprises the steps of:
- determining a battery pack charging start time based on said location departure time information and said set of battery pack charging conditions;
- inputting said battery pack charging start time into said electric vehicle charging system; and
- initiating said battery pack charging step in response to said battery pack charging start time.

34. The method of claim 33, further comprising the step of inputting electricity cost as a function of usage time data into said battery pack charging controller, wherein said battery pack charging start time determining step is based on said location departure time information, said set of battery pack charging conditions and on said electricity cost as a function of usage time data.

35. The method of claim 33, further comprising the step of obtaining electricity cost as a function of usage time data, wherein said electricity cost as a function of usage time data obtaining step is performed by said battery pack charging controller, and wherein said battery pack charging start time determining step is based on said location departure time information, said set of battery pack charging conditions and on said electricity cost as a function of usage time data.

36. The method of claim 27, further comprising the step of inputting mid-travel recharging information into said battery pack charging controller using said user interface, wherein said set of battery pack charging conditions is based on said third quantity of electrical energy and on said mid-travel recharging information.

37. The method of claim 27, further comprising the step of inputting driving style information into said battery pack charging controller using said user interface, wherein said set of battery pack charging conditions is based on said third quantity of electrical energy and on said driving style information.

38. A method of charging a battery pack of an electric vehicle, the method comprising the steps of:
inputting a travel plan into a battery pack charging controller using a user interface, wherein said travel plan is comprised of location information;
obtaining weather condition information, wherein said weather condition information obtaining step is performed by said battery pack charging controller;
calculating a total travel miles corresponding to said travel plan;
determining a present battery pack state of charge, wherein said present battery pack state of charge corresponds to a first quantity of electrical energy stored within said battery pack;
converting said total travel miles to a second quantity of electrical energy using a miles-to-electrical conversion factor, wherein said second quantity of electrical energy corresponds to a level of electrical energy required to be stored in the battery pack for the electric vehicle to travel said total travel miles, and wherein said miles-to-electrical conversion factor varies based on said weather condition information;
calculating a third quantity of electrical energy, wherein said third quantity of electrical energy corresponds to the difference between said second quantity of electrical energy and said first quantity of electrical energy;
determining a set of battery pack charging conditions, wherein said set of battery pack charging conditions is based on said third quantity of electrical energy;
inputting said set of battery pack charging conditions into an electric vehicle charging system; and
charging the battery pack of the electric vehicle with said electric vehicle charging system in accordance with said set of battery pack charging conditions.

39. The method of claim 38, wherein said battery pack charging controller is an on-board battery pack charging controller, and wherein said on-board battery pack charging controller performs said steps of calculating said total travel miles, converting said total travel miles to said second quantity of electrical energy, calculating said third quantity of electrical energy, determining said set of battery pack charging conditions, and inputting said set of battery pack charging conditions into said electric vehicle charging system.

40. The method of claim 38, wherein said step of determining a set of battery pack charging conditions further comprises the step of setting a cut-off voltage.

41. The method of claim 38, further comprising the step of calculating a battery power safety margin, wherein said battery power safety margin corresponds to a fourth quantity of electrical energy, and wherein said set of battery pack charging conditions is based on said third quantity of electrical energy and on said fourth quantity of electrical energy.

42. The method of claim 41, further comprising the step of setting a minimum battery power safety margin.

43. The method of claim 41, further comprising the steps of inputting a battery power safety margin using said user interface, converting said battery power safety margin to a fourth quantity of electrical energy, and wherein said set of battery pack charging conditions is based on said third quantity of electrical energy and on said fourth quantity of electrical energy.

44. The method of claim 38, wherein said step of inputting said travel plan into said battery pack charging controller further comprises the step of inputting location departure time information into said battery pack charging controller using said user interface, and wherein said method further comprises the steps of;
determining a battery pack charging start time based on said location departure time information and said set of battery pack charging conditions;
inputting said battery pack charging start time into said electric vehicle charging system; and
initiating said battery pack charging step in response to said battery pack charging start time.

45. The method of claim 44, further comprising the step of inputting electricity cost as a function of usage time data into said battery pack charging controller, wherein said battery pack charging start time determining step is based on said location departure time information, said set of battery pack charging conditions and on said electricity cost as a function of usage time data.

46. The method of claim 44, further comprising the step of obtaining electricity cost as a function of usage time data, wherein said electricity cost as a function of usage time data obtaining step is performed by said battery pack charging controller, and wherein said battery pack charging start time determining step is based on said location departure time information, said set of battery pack charging conditions and on said electricity cost as a function of usage time data.

47. The method of claim 38, further comprising the step of inputting mid-travel recharging information into said battery pack charging controller using said user interface, wherein said set of battery pack charging conditions is based on said third quantity of electrical energy and on said mid-travel recharging information.

48. The method of claim 38, further comprising the step of inputting driving style information into said battery pack charging controller using said user interface, wherein said set of battery pack charging conditions is based on said third quantity of electrical energy and on said driving style information.

* * * * *